(12) United States Patent
Paperny et al.

(10) Patent No.: US 7,559,034 B1
(45) Date of Patent: Jul. 7, 2009

(54) METHOD AND SYSTEM FOR USING A HYPERLINK, BANNER, OR GRAPHICAL ICON TO INITIATE THE OVERLAYING OF AN OBJECT ON A WINDOW

(75) Inventors: Dmitry Paperny, New York, NY (US); Sreekant Kotay, Richboro, PA (US)

(73) Assignee: DG FastChannel, Inc., Irving, TX (US)

( * ) Notice: Subject to any disclaimer, the term of this patent is extended or adjusted under 35 U.S.C. 154(b) by 1507 days.

(21) Appl. No.: 09/692,498

(22) Filed: Oct. 19, 2000

(51) Int. Cl.
G06F 15/00 (2006.01)
G06F 13/00 (2006.01)

(52) U.S. Cl. ...................... 715/803; 345/629

(58) Field of Classification Search ............ 345/790, 345/793, 794, 798, 799, 802, 803, 807, 764, 345/781, 784, 785, 419, 428, 628, 429; 715/790, 715/807, 793–794, 798–799, 802–803, 781, 715/784–785, 853, 854, 763–765, 760, 856, 715/862, 800, 840, 851
See application file for complete search history.

(56) References Cited

U.S. PATENT DOCUMENTS

| | | | |
|---|---|---|---|
| 5,737,619 A | 4/1998 | Judson | |
| 5,740,549 A | 4/1998 | Reilly et al. | |
| 5,801,698 A | 9/1998 | Lection et al. | |
| 5,990,905 A * | 11/1999 | Chew et al. | 345/630 |
| 5,995,102 A | 11/1999 | Rosen et al. | |
| 6,023,275 A * | 2/2000 | Horvitz et al. | 345/700 |
| 6,072,489 A * | 6/2000 | Gough et al. | 715/803 |
| 6,216,141 B1 * | 4/2001 | Straub et al. | 715/513 |
| 6,288,801 B1 * | 9/2001 | Leberl et al. | 358/474 |
| 6,295,061 B1 | 9/2001 | Park et al. | |
| 6,331,861 B1 * | 12/2001 | Gever et al. | 345/629 |
| 6,333,753 B1 * | 12/2001 | Hinckley | 715/768 |
| 6,340,977 B1 * | 1/2002 | Lui et al. | 345/709 |
| 6,362,817 B1 * | 3/2002 | Powers et al. | 345/419 |
| 6,370,541 B1 * | 4/2002 | Chou et al. | 707/103 X |

(Continued)

FOREIGN PATENT DOCUMENTS

WO 99/35832 A 7/1999

(Continued)

OTHER PUBLICATIONS

May 29, 2007 Search Report for EP 01979839.6-2211.

*Primary Examiner*—Kevin Nguyen
(74) *Attorney, Agent, or Firm*—Kenyon & Kenyon LLP

(57) ABSTRACT

A method and system for overlaying an object in a window of a software application where an overlay plane is composed of at least one object and the overlay plane is overlaid with the window using either a layering feature of the software application or by directly compositing the overlay plane with the window using enhanced functionality not included in the software application. The overlaying of the overlay plane in relation to the window does not depend on a cursor or pointing device designated position but may rather, for example, be arbitrarily placed or may be positioned in proximity to the text or graphic link used to initiate the overlaying process. The method and system may be implemented using a plugin-control for the software application.

94 Claims, 35 Drawing Sheets

U.S. PATENT DOCUMENTS 6,452,609 B1 * 9/2002 Katinsky et al. ............ 345/716
6,643,652 B2 * 11/2003 Helgeson et al. ............. 707/10
6,657,647 B1 * 12/2003 Bright ....................... 715/856
6,704,034 B1 * 3/2004 Rodriguez et al. .......... 715/860
6,981,224 B1 * 12/2005 Gardner et al. .............. 715/760

FOREIGN PATENT DOCUMENTS

WO    WO 00/48069    *   8/2000
WO    WO 01/44969       6/2001

* cited by examiner

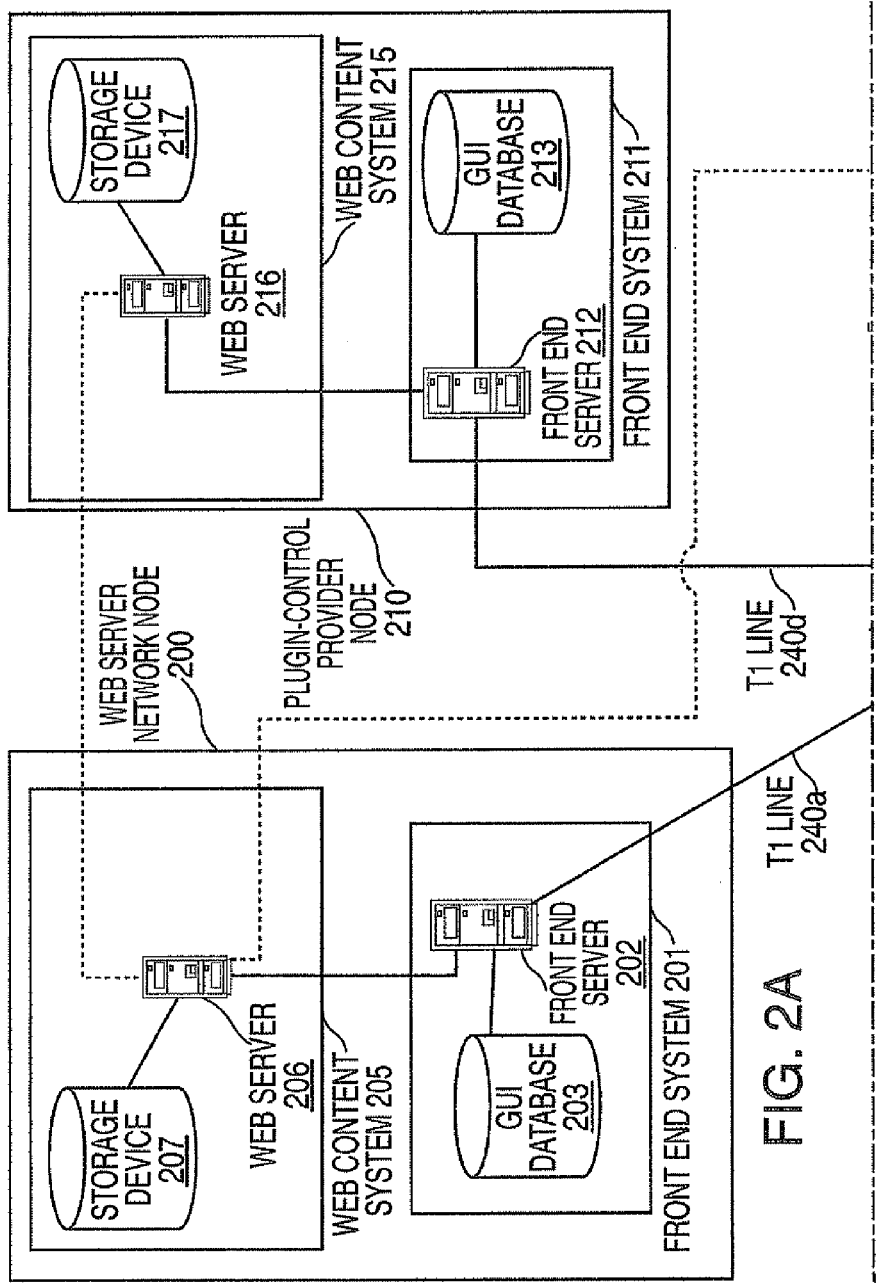

```
303    ' this pointer is used to try to instantiate the ActiveX Control
306    Dim Plugin_obj
309
312    ' function: ie_detect()
315    ' purpose : This VBscript will try to detect the plug-ins for IE 4.0 and up. It attempts
318    '           to create the ActiveX Controls passed to it, checks for successful creation,
321    '           then destroys them. This script will be ignored by Netscape browsers.
324    Function ie_detect(objectName)
327
330        ' return value - defaults to not detectable unless otherwise set later
333        ie_detect = 2    ~1
336
339        ' CreateObject is only supported with VBScript version 2+, so
342        ' only do the check if it is supported. Otherwise, return false
345        if ScriptEngineMajorVersion >= 2 then
348
351            'Indicates that the control is detectable
354            ie_detect = 1    ~2
357
360            ' Ignore errors if possible, if the client has a script debugger installed,
363            ' this error handling will not work, but is should not be needed
366            On Error Resume Next
369
372            'Create ActiveX Control Instantiation
375            Set Plugin_obj = CreateObject(objectName)    ~4
378
381            'Check whether Control was properly instantiated
384            if IsObject(Plugin_obj) then    ~5
387
391                'Indicates that the control has been found
394                ie_detect = 0    ~3
395                end if
396
397        end if
398    End Function
399    ' END FILE
```

```
403  <?xml version="1.0"?>
406  <MTSScene Version="2">
409    <MTSSceneParmsEdgeBias="1"/>
412    <MTSCamera WalkMode="0" OrbitDist="4">         ┐
415      <Rotate x="35.62254" y="30.69068" z="0" />    │ 1
418      <ViewLocation x="0" y="0" z="4" />            │
421    </MTSCamera>                                    ┘
424    <MTSObject Name="teapot" >                      ┐
427      <MTSObject Name="teapot" >                    │
430        <MTSObject Name="teapot__MESH__0" >         │
433          <Transform Type="current">                │ ┐
436            <Scale x="0.01" y="0.01" z="0.01"/>     │ │ 3
439            <Position x="-0.06733" y="-0.48965" z="-0.00177" />  │ │
442          </Transform>                              │ ┘
445          <MTSMaterial Name="teapot_MATERIAL__0" ID="0" >        │ 2
448            <MTSTextureMap Type="Diffuse" Name="teapot__TEXTURE__0" />
451          </MTSMaterial>                            │
454        </MTSObject>                                │
457      </MTSObject>                                  ┘
460    </MTSObject>
463    <MTSTimeElem Name="teapot" Type="MTSStream" On="1" Path="teapot.mts">  ┐
466      <Target Name="teapot" />                                              │
469    </MTSTimeElem>                                                          │ 4
472    <MTSTimeElem Name="teapot__anim" Type="MTSStream" On="1" Path="teapot.mts">│
475      <Target Name="teapot" />                                              │
478    </MTSTimeElem>                                                          ┘
481  </MTSScene>
```

```
503     <td align=LEFT valign="TOP width="60" height="100">
505     <div id="Scooter" style="position:absolute; left:70px; top:140px; width:505px; height:359px; z-index:1; visibility: hidden">
509         <object id="MetaStreamCtl"
                classid="CLSID:03F998B2-0E00-11D3-A498-00104B6EB52E"
                width=500
                height=360>
512             <embed component="ISceneComponent" componentfilename="SceneComponent.mtc"
source="vw_bug_mts.mtx" type="application/x-mtx" width=532 height=448 border="true" script="true">
516             </embed>
519             <param name="Source" value="scooter.mtx">
522             <param name="Component" value="ISceneComponent">
525             <param name="ComponentFileName" value="SceneComponent.mtc">
528             <param name="BroadcastKey" value="bff921b6aede2839bedf8603c4348ee87d58535a-1da0-
www.metastream.com">
531         </object>
534     </div>
536     </td>
            .
            .
539     <a href="#"
542     onMouseOut="MM_swapImgRestore()"
545     onMouseOver="MM_swapImage('Image1',,'images/Scoot_01-over.gif',1)"
548     onClick="MM_showHideLayers('MP3',,'hide','TVVideo',,'hide','Scooter',,'show','Palm',,'hide')"
551     <img src="images/Scoot_01.gif" width="105" height="18" align="absbottom" border="0" name="Image1">
554     <a>
            .
            .
```

FIG. 5

METHOD AND SYSTEM FOR USING A HYPERLINK, BANNER, OR GRAPHICAL ICON TO INITIATE THE OVERLAYING OF AN OBJECT ON A WINDOW

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark office, patent file or records, but otherwise reserves all copyright rights whatsoever.

FIELD OF THE INVENTION

The present invention relates to a computer system and method for using a hyperlink, banner, or graphical icon to initiate the overlaying of an object in a parent window.

BACKGROUND INFORMATION

There is great interest in exploiting the capabilities of the Internet World Wide Web ("Web") by providing advertising to generate revenue for Web sites. A Web site is a grouping of one or more associated Web pages sharing a common domain. Each Web page is a document that is displayed as a single window of information. Web advertising is predominantly implemented through the use of banner advertisements on these Web pages. With the evolution of the Internet and the Web from an Academic to mainstream medium, advertising became a commercially feasible activity.

The birth of true Web-based advertising began in 1994 with a banner advertisement from AT&T™ on the "hotwired.com" Web site. A banner advertisement (hereinafter "banner") is a graphic or image contained on either a Web page or a portion of a display screen and used for advertising. Since the pioneering AT&T™ advertisement, the banner has become the predominant form of Web advertising. From modest beginnings in 1994, the banner has today evolved into eight commonly accepted types and sizes as identified by the Standards and Practices Committee of the Internet Advertising Bureau (IAB). FIG. 1 is a diagram illustrating the eight commonly accepted IAB types and sizes of banner advertisements. These categories are:

| Type of Banner | Size in Pixels |
| --- | --- |
| Micro Button 170 | 88 × 31 |
| Button 150 | 120 × 60 |
| Button 140 | 120 × 90 |
| Square Button 160 | 125 × 125 |
| Vertical Banner 130 | 120 × 240 |
| Full Banner w/Vert. Navigation Bar 110 | 392 × 72 |
| Half Banner 120 | 234 × 60 |
| Full Banner 100 | 468 × 60 |

In addition to these commonly accepted banner types and sizes, countless customized implementations exist catering to the specific needs of advertisers and Web site owners. The growth of the banner can be attributed to both advertisers' demand for finding new ways of reaching their target audiences and the desire of Web site owners to raise revenue in order to pay for or profit from the maintenance of their Web sites.

In order to judge the effectiveness of a banner in reaching a desired demographic, various metrics have been developed. The Coalition for Advertiser Supported Information and Entertainment (CASIE) has published a glossary of Web marketing terms. In 1997, the Media Management Task Force of the IAB published voluntary guidelines for online advertising in their *Metrics and Methodology* document. Both are industry efforts to standardize the use of metrics in online advertising. The most frequently used metric for banner effectiveness is the click-through ratio (CTR). CTR is a ratio measuring the number of times a banner is clicked on to the number of times a banner is shown. For example, if a banner is clicked on 5 times out of the 100 times that the banner is shown, the banner has a CTR of 5:100 or 5%. Optimizing CTR is the focus of most Web advertising today and has led to further innovation in the field.

The problem with banners is that the Web has become so saturated with them that users have learned to tune them out. In order to compensate for this user disinterest, banner designers have become increasingly more innovative and have provided more stimulating content to the banners such as animation and video (e.g., rich media). These innovations are still designed to maintain or increase CTR and don't address a second problem with banners. Users often don't respond to banner advertisements or to hyperlinks (also known as "hypertext links") because they know that clicking on either will result in them being moved to another Web site. Users are generally at a Web site because they want to view the content offered and often do not want to be moved to another Web site. For this reason, CTR remains constant or continues to drop as users are less inclined to click through to other Web sites. Therefore, displaying full advertising content without taking the user away from the current Web site and Web page is a need that has existed for quite some time and has not been adequately solved until the advent of the present invention.

In addition to Web-based advertising, the development of small-scale data display devices also presents a problem that has not been addressed. Small-scale display devices such as personal digital assistants (PDAs), Internet/Web-enabled phones, non-Web enabled phones with digital displays, and electronic books (e-books) have increased tremendously in availability but are still plagued by a limited display area. Conventional means have not overcome the limitations of this restricted display and the only way to present a greater amount of information is to provide scrolling within an application window (the window may be the screen display) or by displaying a new window of information. The present invention solves this need by providing an alternative method of reusing the display space without calling new windows or leaving the data already being displayed on the screen.

The problem faced by Web-advertisers in trying to maximize the screen space used without effecting the underlying content attracting a user to a Web page also arises in a non-advertising context. Many software applications and documents may benefit from reusing the screen display area to provide expanded information to a user without leaving the currently displayed underlying information. For example, an Adobe® Acrobat document containing a description of a new aircraft may not want to bog a reader down in details about the engines used by the new aircraft. Providing a means for displaying additional engine information (e.g., technical illustrations) to those readers wanting this additional information while avoiding this additional complexity for other readers where in both instances the underlying data remains available to the reader is clearly advantageous but not convenient in conventional embodiments of window-based software applications. The present invention solves this need by providing a convenient means for reusing the display space while still displaying the underlying window of a software application.

SUMMARY OF THE INVENTION

The present invention provides a method and system for using a hyperlink (also known as a hypertext link), banner advertisement ("banner"), or graphical icon to initiate the overlaying of content (e.g., a transparent advertisement or a technical illustration) with a window, such as a Web page, Adobe® Acrobat® document, PDA-based software window, or e-book screen. According to one example embodiment of the present invention, the additional content is displayed in an "overlay plane" that may be implemented using an intrinsic layering feature (e.g., DHTML layering) of the window's host program, the window-based application software. Layering allows for the fast display of the object with the window without necessitating the recalculation (i.e., rerendering) of the scene. In an alternative embodiment of the present invention, the overlay plane may be directly overlaid with the underlying window without using an intrinsic layering feature of the window-based application.

In one embodiment of the present invention, a viewer plugin-control may be used to receive and display media content to be overlaid with the window. This viewer plugin-control may be a Netscape Navigator or Communicator plugin, Microsoft ActiveX control, or other plugin-control. The viewer plugin-control, if installed for the window-based application (e.g., a Web browser), may be registered by the application when the application starts up. If the viewer plugin-control is not installed, content (i.e., data types) designed for the viewer plugin-control may not be recognized by the window-based application or the user may be prompted to download the viewer plugin-control when the unrecognized content is encountered. The user may also be prompted to download a different version of the viewer plugin-control if a more recent version is available or if the content (i.e., data types) require a specific version of the viewer plugin-control. Even though the viewer plugin-control may be registered with the window-based application, a separate instance must be created for each use such as for each window (e.g., Web page, Adobe® Acrobat® document, PDA-based software window, or e-book screen) encountered with viewer plugin-control content. If the instantiation procedure should fail, an alternative image file may be specified and displayed in place of the viewer plugin-control content. In other embodiments of the present invention, a viewer plugin-control may not be necessary for the display of content according to the present invention.

The overlaying process may be initiated according to one embodiment of the present invention by an event (e.g., click event, rollover event) or situational value (e.g., date or IP address of user). In one embodiment, a click event on a hyperlink, banner, or graphical icon may initiate the overlaying process. The overlaying process may begin with a determination to see if an instance of the viewer plugin-control exists according to one embodiment of the present invention. If an instance does not already exist, a new attempt at instantiation may be performed. If this new instantiation attempt is unsuccessful, a substitute image (e.g., a JPEG image or a GIF image) may be overlaid with the window instead of the otherwise planned content. If the instantiation is successful, the media object (i.e., the content) may be retrieved. In an alternate embodiment of the present invention where a viewer plugin-control is not used, neither the instantiation process needs to occur nor will a substitute image for the content be beneficial.

Content information may be stored in one or more files according to one embodiment of the present invention. A first file may be a markup language file that contains the formatting instructions for the content. This markup language file may be an eXtensible Markup Language ("XML") or HyperText Markup Language ("HTML") file according to one embodiment of the present invention. This first file may contain formatting information including camera viewpoint and location, transformations, texture mapping, transitions, and streaming for the object or content. A second file may contain the actual contents (i.e., the data) of the object or content and may be in a binary or compressed binary format.

According to one embodiment of the present invention media objects (i.e., content) may be overlaid (e.g., layered or composited) on top of each other. For example, where the window-based application support layering, a movie may be placed in a second layer displayed over an animation in a first layer where both the first and second layers are overlaid on top of the underlying window (e.g., Web page, Adobe® Acrobat® document, PDA-based software window, or e-book screen). In this example, the movie in second layer may be positioned directly above the screen area of a television 3D object in the first layer animation resulting in a presentation where a movie plays on the animated television inside an image. Placing objects on top of each other may be done using layers where layering is supported by the window-based host application of the window as just explained and may also be performed through direct overlaying (e.g., compositing) of the content (i.e., objects). When providing multimedia integration or the integration of multiple single media objects (i.e., content), a single layer may be used or multiple layers may be used where the underlying window-based application supports layering.

In one example embodiment of the present invention, the objects (i.e., content) of the overlay plane may be pre-fetched (i.e., retrieved before they are needed) and hidden. In one embodiment of the present invention, the hidden overlay plane may be one or more layers. The hidden overlay plane may be made visible when the user initiate the overlay process for the content. In another embodiment of the present invention, content is only retrieved when the overlay process is triggered by, for example, a user initiated event such as a click event on a hyperlink, banner, or graphical icon or by a non user-initiated event such as a timing event. According to one embodiment of the present invention, the overlay plane may be displayed using a variety of transitions many not available using the intrinsic functionality of the window-based application or not available without less efficient processing such as, for example, continually resizing and displaying a layer to achieve a zoom-in transition effect. The present invention may allow semi-transparent and transparent edges (also known as "feathered edges") for the overlay plane both of which are not generally available with conventional window-based application. For example, DHTML layers do not expressly provide semi-transparent or transparent edges for layers.

The present invention may use any conventional or hereto unknown future method of overlaying (i.e., drawing) an object with a window (e.g., compositing). In one embodiment of the present invention, a method for compositing described in co-pending U.S. patent application Ser. No. 09/620,942 with a filing date of 21 Jul. 2000 and title "Method and System for Displaying a Composited Image" the entire specification and disclosure of which is expressly incorporated herein by reference may be used. According to this embodiment of the present invention, multiple buffering without a Z-buffer where at least one of the multiple buffers is implemented in addition to the window's host program (i.e., the window's container) may be used to composite the overlay plane (i.e., the layer or object) with the window in order to create a "composited image." The embodiment just described may apply where the window is a Web page in a Web browser host program. In this situation, the embodiment of the present invention may use the two Web browser provided buffers (i.e., one off-screen buffer termed the "back buffer" and an on-screen buffer termed the "front buffer") and at least one auxiliary buffer allocated by a viewer plugin-control to compose and draw the composited image.

BRIEF DESCRIPTION OF THE DRAWINGS

FIG. 3 is an example visual basic script that detects whether an ActiveX control exemplary embodiment of the present invention viewer plugin-in control already exists.

FIG. 4 is an example XML document containing the formatting information for viewer plugin-control content (i.e., the object) to be overlaid with the window according to one embodiment of the present invention.

FIG. 5 is an example of the HTML language commands for incorporating an object as a layer in the Web browser example window-based application referenced here according to one embodiment of the present invention.

DETAILED DESCRIPTION

The present invention provides a method and system for using a hyperlink (also known as a hypertext link), banner, or graphical icon to initiate the overlaying of an object in a window. According to the present invention, overlaying is a drawing technique where objects are overlaid with a background resulting in a final presentation where the objects and background appear to be integrated. Any type of media content may be used in the overlaying according to one embodiment of the present invention. Although the embodiments described herein primarily relate to browser software for the Internet World Wide Web ("Web"), practitioners skilled in the art will recognize that the present invention is compatible with any window-based software. For example, one embodiment of the present invention may relate to Adobe® Acrobat® documents. Another embodiment of the present invention may relate to personal digital assistant (PDA)-based software and/or electronic book (e-book) software where the window is generally the entire screen. In addition to the diverse scope of software with which the present invention may work, the present invention may be implemented using either the native features of this software or the operating system or may be implemented through the use of plugins or controls ("plugin-controls") which are software routines designed to add functionality to the host program. For example, one embodiment of the present invention may work with software that allows both dynamic third-party plugin-controls and transparent drawing, including browser software running on public and private non-Internet information networks. In this example, the present invention could be implemented on custom developed browser software using a private Intranet, local area network (LAN), metropolitan area network (MAN), wide area network (WAN), or even a wireless network. In other embodiments, the present invention may operate with software that does not allow third-party plugin-controls or transparent drawing.

Figure 1:
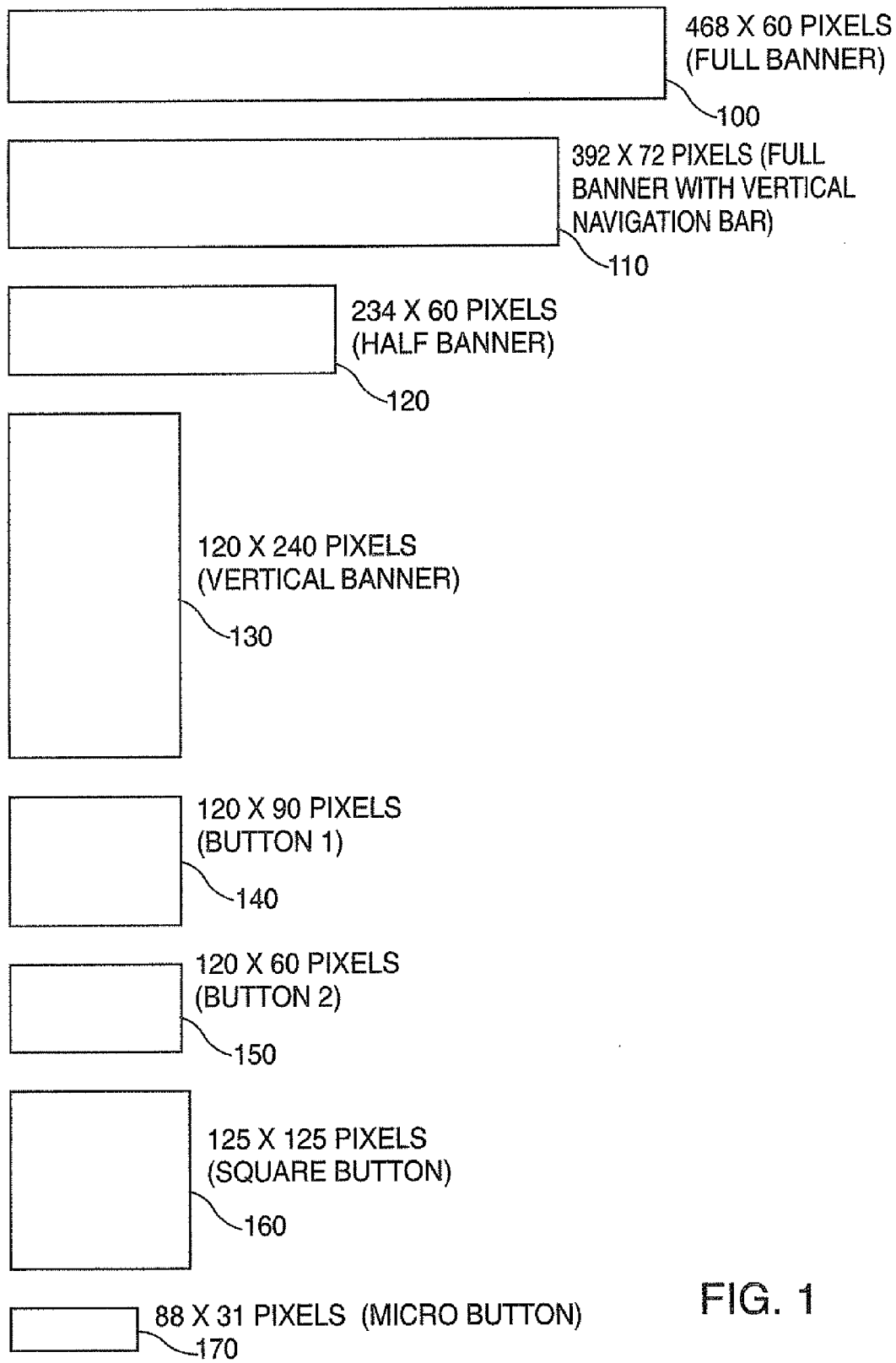
FIG. 1 is a diagram illustrating the eight commonly accepted IAB types and sizes of banner advertisements.
Figure 2B:
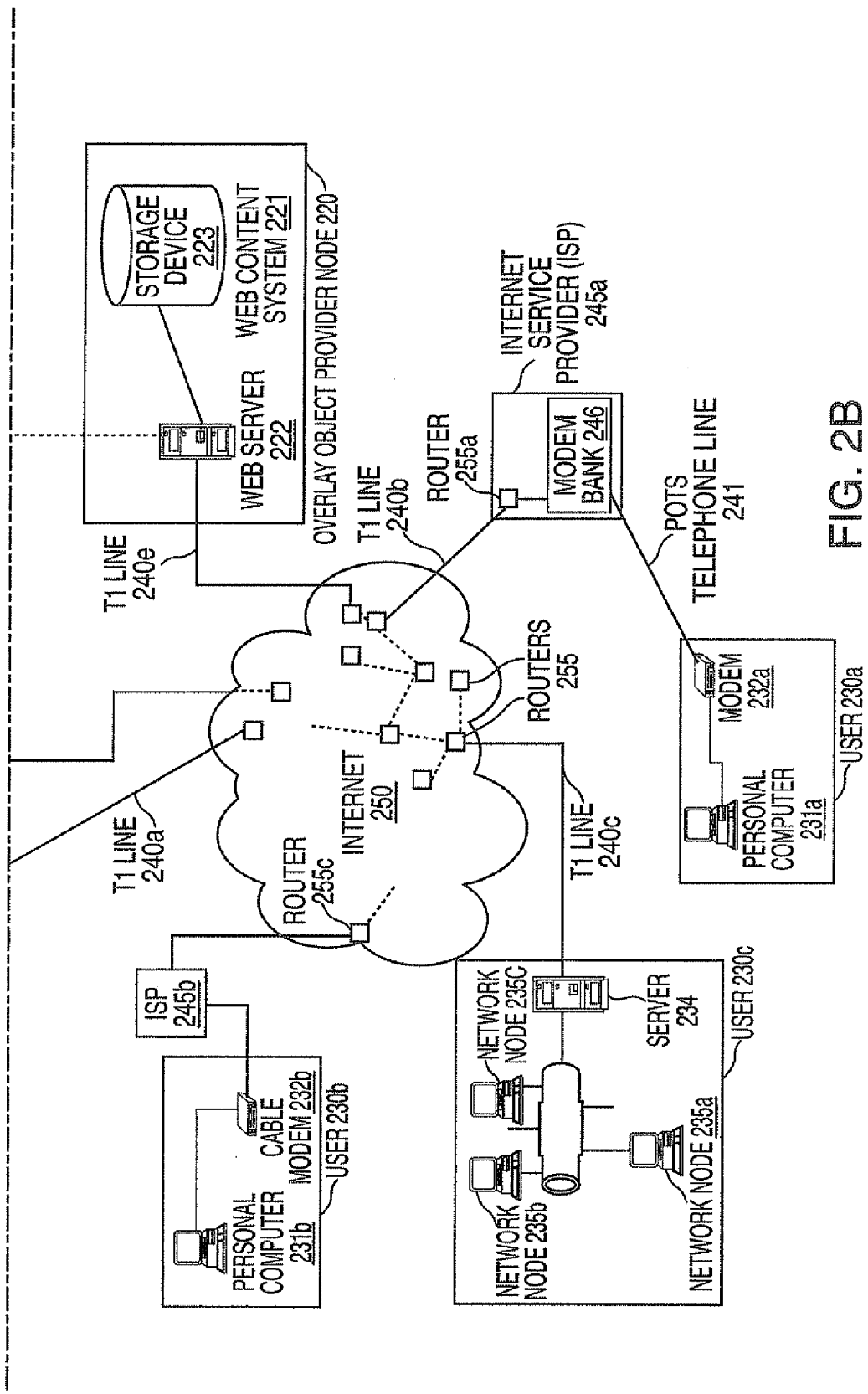
FIG. 2 is a block diagram depicting an example of a network topology illustrating the relationship between the Internet, users, a Web server network node, a plugin-control provider node, and an overlay object provider node according to one embodiment of the present invention.

FIG. 2 is a block diagram depicting an example of a network topology illustrating the relationship between the Internet, users, a Web server network node, a plugin-control provider node, and an overlay object provider node according to one embodiment of the present invention. The Web server network node 200, plugin-control provider node 210, and overlay object provider node 220 may make available one or more Web sites which users 230 may visit by connecting to the respective network node. A Web site is a grouping of one or more associated Web pages sharing a common domain. Each Web page is a document defined using a markup language such as the HyperText Markup Language ("HTML") or the eXtensible Markup Language ("XML"). The Web page document contains markup language instructions (i.e., commands) that are interpreted by a Web browser to provide a display of information to a user. These markup language instructions may, for example, include directions for downloading a plugin-control in order to play or handle a specific media type (i.e., type of content) contained or referenced in the markup language document. A plugin-control may be downloaded because the content requires an absent plugin-control, because there is a new version of the plugin-control (automatic upgrade), or because the content requires a specific version of the plugin-control. In a further example, additional instructions may include directions for finding and displaying specific objects within the document. These specific objects may be a particular type of media and may necessitate the use of specific plugin-controls as previously mentioned. When a user 230 views a document such as a Web page, the markup language document is transmitted to the user 230 over an information network such as the Internet 250. The user's local Web browser application (not shown) receives the document and does the interpreting of the markup language code resulting in a Web page being locally displayed to the user.

Users 230a-230c are coupled to the Web server network node 200, plugin-control provider node 210, and the overlay object provider node 220 via an information network such as the Internet 250. According to the embodiment depicted in FIG. 2, Web server network node 200 is coupled to the Internet 250 via T1 line 240a while plugin-control provider node 210 is coupled to the Internet 250 via T1 line 240d and overlay object network node 220 is coupled to the Internet 250 via T1 line 240e. In particular, each user 230 is coupled to the Internet 250 via a respective network interface. User 230a utilizes a narrowband network interface 241 comprising a dial-up connection, while users 230b-230c utilize broadband network interfaces respectively comprising a cable modem with cable 232b and a T1 line 240c. Corporate user 230c includes three network nodes 235a-235c that share bandwidth on a local Ethernet network 233. Although FIG. 2 illustrates three users 230a-230c, it is to be understood that Web server network node 200, plugin-control provider node 210, and overlay object provider node 220 may serve any arbitrary number of users 230 limited only by the processing power and bandwidth available.

User 230a illustrates an example of a typical narrowband user connected to the Internet 250 via a dial-up connection 241. User 230a utilizes a personal computer 231a and a modem 232a to access Internet Service Provider (ISP) 245a and navigate the Web 250 via Web browser software (not shown). The Web browser software permits navigation between various Web document servers connected to the Internet 250, that may include the front end server 202 at a Web server network node 200, the front end server 212 at a plugin-control provider node 210, and a Web server 222 at an overlay object provider node 220. In addition to assisting with navigation between Web servers, the Web browser software interprets the markup language code contained in Web documents (i.e., Web pages) and provides functionality for the rendering of files distributed over the Internet (e.g., through the use of plugins or ActiveX controls).

User 230b illustrates an example of a typical broadband user connected to the Internet 250 via a broadband cable connection. In particular, user 230b utilizes personal computer 231b to transmit and receive packets of data via cable modem 232b to and from a cable provider ISP 245b where the packets are routed over the Internet 250 to/from front end server 202 at Web server network node 200, front end server 212 at plugin-control provider node 210, and Web server 222 at overlay object provider node 220. Similar to user 230a, user 230b may utilize browser software to navigate the Internet 250 and the Web.

Corporate user 230c includes network nodes 235a-235c, which are coupled to the Internet 250 via local Ethernet network 233, server 234, T1 line 240c of corporate user 230c. Network nodes 235a-235c may communicate with Web server network node 200, plugin-control provider node 210, and overlay object provider node 220 via local Ethernet 233, server 234, T1 line 240c, Internet 250, and T1 line 240a/240d/240e (respectively). Similar to users 230a-230b, users at network nodes 235a-235c may utilize browser software to navigate the Internet 250 and the Web.

The specific nature of users 230a-230c and the methods through which they are coupled to the Internet 250 depicted in FIG. 2 are merely exemplary. The present invention is compatible with any type of Internet client and/or connection whether broadband or narrowband. In general, it is to be understood that users 230 may connect to the Internet 250 using any potential medium whether it be a dedicated connection such as a cable modem, T1 line, DSL ("Digital Subscriber Line"), a dial-up POTS (Plain Old Telephone Service) connection or even a wireless connection.

The Web server network node 200, plugin-control provider node 200, and overlay object provider node 220 are all examples of nodes on the Internet 250 and the Web. Web server network node 200 includes front end subsystem 201 and Web content system 205. Front end subsystem 201 provides a Graphical User Interface ("GUI") to allow users 230 to transmit and receive information with Web server network node 200. In particular, according to one embodiment, front end subsystem 201 includes front end server 202 and GUI database 203. GUI database 203 may contain markup language (e.g., HTML or XML) specific information for interpreting and displaying markup language documents such as Web pages. In particular, GUI database 203 serves markup language documents (i.e., Web pages) to users 230 coupled to the Web server network node 200.

The Web server network node 200 also includes Web content system 205, which provides a locus for processing the content of documents, such as Web pages, for transmission to users via the Internet 250. Front end server 202 is coupled to Web server 206 at Web content system 205. According to one embodiment, Web content system's 205 Web server 206 includes at least one processor (not shown) to perform processing of the document content such as locating and downloading an object or determining the appropriate plugin-control to play or view a MIME (Multipurpose Internet Mail Extensions) data type. Additionally, Web server 206 further includes program memory (not shown) for storing instructions for the execution of processes such as drawing a transparent plugin-control on a Web page as well as other processes mentioned herein.

The plugin-control provider node 210 includes front end subsystem 211 and Web content system 215. Front end subsystem 211 is similar to front end subsystem 201 and provides an interface to allow users 230 to transmit and receive information with plugin-control provider node 210. In the embodiment shown, front end subsystem 211 includes front end server 212 and GUI database 213. GUI database 213 may contain markup language specific information for interpreting and displaying markup language documents such as Web pages. In particular, GUI database 213 serves markup language-based documents (i.e., Web pages) to users 230 coupled to plugin-control provider node 210. The Web content system 215 of plugin-control provider node 210 provides a locus for listing and transmitting plugin-controls to users via the Internet 250. Front end server 212 is coupled to Web server 216 at Web content system 215. According to one embodiment, Web content system's 215 Web server 216 includes at least one processor (not shown) to perform the listing and transmitting of a plugin-control to a user. Additionally, Web server 216 further includes program memory (not shown) for storing instructions for the execution of processes such as the listing and transmitting of a plugin-control to a user over the Internet 250.

The overlay object provider node 220 does not include a front end subsystem in the embodiment shown in FIG. 2 as did the Web server network node 200 and the plugin-control provider node 210. Instead, the overlay object provider node 220 represents an embodiment of a network node where the front end subsystem tasks are handled by the Web content system's 221 Web server 222 and are not separated. Web server 222 provides an interface to allow users 230 to transmit and receive information with overlay object provider node 220. The specific information for interpreting and displaying markup language documents such as Web pages are stored in storage device 223 and the Web server 222 may use this information to serve markup language documents (i.e., Web pages) to users 230 connected to overlay object provider node 220. The overlay object provider node 220 provides a locus for an object to be incorporated into the markup document (i.e., Web page). For example, a Web page served to a user 230*a* by the Web server network node 200 may reference an object contained at the overlay object network node 220 which the user's 230*a* local Web browser will find and download based on the markup instructions found in the markup language document (i.e., Web page). According to one embodiment, Web server 222 includes at least one processor (not shown) to perform the processing of a user request for and the transmitting of an object. Additionally, Web server 222 may further include program memory (not shown) for storing instructions for the execution of processes such as the processing for and the transmitting of an object to a user over the Internet 250.

The Web server network node 200, plugin-control provider node 210, and overlay object provider node 220 are each shown as separate network nodes illustrating network nodes that provide a Web page, a plugin-control, or an object on a Web page, respectively, to a user. A practitioner skilled in the art will recognize that any two or all three of these nodes may be combined into one network node and as such the example network topology is not intended to restrict the interpretation of network node configurations.

Further elaborating on the browser software discussed above, in the Internet world, Netscape's Navigator and Netscape's Communicator Web browsers (both are hereinafter referred to as "Navigator") and Microsoft's Internet Explorer (hereinafter "Explorer") overwhelmingly dominate the market for Web browsers and as such are the only two Web browsers discussed. However, the present invention may apply to all Web browsers as well as to non-Web network browsers and any window-based application that permits the use of plugin-controls to add increased functionality to the window-based application. The scope of both the Navigator and Explorer browser software is limited out of necessity and therefore they allow third-party software providers to extend the functionality of their browser software. This reliance on third-party software provider extensions to browser functionality arise from the very complex nature of the browser programs themselves.

The embodiment described in the network topology in FIG. 2 where the present invention makes use of a plugin-control is only one exemplary embodiment. The present invention, as previously discussed, may also be used with non-browser window-based software such as Adobe® Acrobat® and screen-based PDA or e-book software applications. Also as previously stated, the present invention in various embodiments may use or may not use plugin-controls. For these reasons, FIG. 2 should neither be construed to limit the present invention to being information network-based or browser-based nor should the present invention be construed as depending on a plugin-control, though in one or more embodiments of the present invention a plugin-control may be used.

Plugins-Controls

It is often very difficult and time-consuming to write a complex software application that can handle many different types of data. Additionally, it is almost impossible to cover all foreseeable data types. Therefore, many complex software applications are written to perform a limited task well with the option of extending the software's functionality through external applications. The main application uses the external applications, typically called plugins or controls (hereinafter plugin-control), to add to or expand on the functionality that the main application contains.

In order for the two applications to work together in an integrated manner, they should know about each other and be able to communicate with each other. Therefore, a protocol and a communication arrangement between the applications should exist. For example, a protocol using standard Unix pipes to communicate is feasible. The plugin-control can read commands from stdin and print responses to stdout. Like other categories of software, Web browsers have their own specific protocols to facilitate this communication. Navigator uses its plugin Application Programming Interface (API) while Explorer uses Object Linking and Embedding (OLE) objects implemented through ActiveX controls to facilitate communication between the main and external plugin-control applications. The use of external plugin-controls is transparent to the user, also allowing the plugin-controls to be nested with one plugin-control calling other plugin-controls. Navigator plugins and Explorer ActiveX controls accomplish the same tasks with different tools. One example embodiment of the present invention includes one or more Navigator plugins while another example embodiment of the present invention includes one or more ActiveX controls with both embodiments implementing a novel method of initiating the overlaying of additional media content with a document (i.e., a window) such as a Web page. The differences between the Navigator plugin and ActiveX plugin control embodiments of the present invention are generally not material to the discussion contained herein and therefore the term plugin-control is used in the example embodiment to refer to both unless further specified. Additionally, because the plugin-control used by an example embodiment of the present invention allows for additional data (i.e., objects) to be overlaid or viewed with the Web page, the plugin-control may be referred to as the viewer plugin-control for the sake of further clarity.

Even though the example embodiment uses a viewer plugin-control, the present invention does not require the use of a plugin-control and may be implemented without using a plugin-control. Additionally, the example embodiment's use of either a Navigator plugin or an ActiveX control as the viewer plugin-control is, in no way intended to limit the scope of the patent to these two embodiments of a viewer plugin-control. The present invention relates to the use of a hyperlink, banner, or graphical icon to initiate the overlaying of an object with the currently viewed document (i.e., the document containing the hyperlink, banner, or graphical icon) of any host and, though Web browsers are the focus of the exemplary embodiment, the present invention may be used with a wide variety of software applications to include PDA-based software and e-book software.

Viewer Plugin-Control Registration/Installation

A window-based application such as a Web browser may search for already installed plugin-controls on program startup and may register those plugin-controls. This registration process may find a viewer plugin-control installed for the window-based application and associated with the data types (e.g., MIME types) the viewer plugin-control supports. For example, the window-based application may search a registry of installed plugin-controls or may search a specific directory in order to find the already installed viewer plugin-control. The data types associated with the viewer plugin-control are determined by the viewer plugin-control file and user-specified browser preferences. For example, the viewer plugin-control file may specify that the viewer plugin-control handles "application/metastream" and "application/x-mtx" MIME types. If the viewer plugin-control and another plugin-control are both associated with the same data type, the window-based application may resolve this conflict by determining the appropriate plugin-control for the data type based on some resolution means. For example, if a conflict exists, a user specified preference may determine which plugin-control is used. In another example, if a conflict exists, the window-based application may associate the last plugin-control installed (i.e., the most recent of the installed plugin-controls that are in conflict over the data type) with the data type. If the viewer plugin-control is not installed, and, therefore, not registered, the data types associated with the absent viewer plugin-control may not be recognized by the window-based application (e.g., Web browser).

Instantiation of the Viewer Plugin-Control

Instantiation is a conventional term describing the process whereby a particular instance of a desired object, such as the viewer plugin-control, is created. For example, the creation of an instance of the desired object may result in a copy of the object being loaded into local memory. According to one embodiment of the present invention, instantiation refers to the creation of a particular instance of the viewer plugin-control object. Instantiation may, according to various embodiments of the present invention, be initiated in one of a number of ways including: on document load, on mouse click, or during the viewer content downloading process. In one embodiment of the present invention, the instantiation of the viewer plugin-control occurs when the markup language document (e.g., Web page) calling for the use of the plugin-control is interpreted and loaded into memory. According to this embodiment, each document (e.g., Web page) that uses the viewer plugin-control will have their own instance of the viewer plugin-control in memory. For example, markup language code within the document may initiate the viewer plugin-control instantiation by calling a script function such as the ie_detect function described in FIG. 3 below. In another embodiment of the present invention, instantiation may occur on mouse click or click through when the user clicks on the hyperlink, banner, or graphical. For example, when a user clicks on a hyperlink, banner, or graphical icon, the markup language source code associated with the link may result in the instantiation of the viewer plugin-control object. Additionally, instantiation may occur during the viewer content downloading process. For example, a click or rollover event on a hyperlink, banner, or graphical icon initiating the display of the overlay plane (containing one or more objects to be overlaid) with the window may result in the downloading of viewer content information. The downloading of viewer content may in itself trigger a check to determine if an instance of the viewer plugin-control already exists and, if not, result in an attempt at instantiating the viewer plugin-control object as shown in FIG. 3 (discussed below).

The document may contain specific markup language commands the cause the instantiation of the viewer plugin-control such as the <embed> and <object> HTML tags. These two HTML tags may be used to embed an instance of the viewer plugin-control in a Web page, layer, or section. Sections are part of Dynamic HTML and require the use an additional HTML tag <layer> to create. The standard HTML <embed> tag allows additional functions and features to be embedded in a Web page by specifying them within the <embed> </embed> tags. The HTML <embed> tag is cross-platform and cross-browser compatible meaning that it can be interpreted by most HTML browsers running on most operating systems. The HTML <object> tag is specific to Internet Explorer running on the Microsoft Windows operating system. In particular, the HTML <object> tag allows additional ActiveX control functionality to be embedded in a Web page. ActiveX controls only work with Internet Explorer running on the Windows operating system, therefore, the HTML <object> tag does not provide cross-platform or cross-browser support unless used with an alternate <embed> tag embedded in the <object> tag. For example, the following use of HTML tags on a Web page allows both Explorer and Navigator to call the viewer plugin-control. <object classid="clsid:A1CCFAC6-E092-11d1-B0F1-00600832DB99" codebase="http://www.metacreations.com/metastream/viewer/win/metastream.cab#Version=2,2,0,0" width="405" height="352">

<param name="Source" value="test.mts">

<embed Src="test.mts" Type="application/metastream" Width="405" Height="352"> </embed>

</object>

Once the viewer plugin-control object has been successfully created (i.e., instantiated), no new instantiation (i.e., re-instantiation) may be required if the overlay plane is hidden from view and then later re-shown. For example, according to one embodiment of the present invention, if an animation is overlaid with a Web page and then the animation is hidden because of some new user event (e.g., a click event on another hyperlink, banner, or graphical icon) resulting in the animation disappearing (i.e., the layer or overlay plane becoming hidden), making the overlay plane (or layer) visible again (by clicking on a hyperlink, banner, or icon that initiates the overlaying process for the layer) does not require the re-instantiation of the viewer plugin-control.

The instance of the viewer plugin-control may be deactivated when a triggering event such as the closing of the overlaid object, the document (i.e., Web page), or the object window (i.e., the overlay plane) occurs. For example, when the user exits from the currently displayed document (i.e., Web page), the instance of the viewer plugin-control may be deactivated and, thus, a new instance of the viewer plugin-control may be needed if the user returns to the same Web page later.

Native Software Features

In an alternate embodiment of the present invention, the present invention is implemented using the native features of the host software and/or operating and not by using a plugin-control. For example, in one embodiment of the present invention using a Web browser, the layer feature of DHTML may be used to implement an overlay plane (the use of the overlay plane is discussed in more detail below). Other features of the host software (e.g., a Web browser, PDA-based software, or e-book software) and/or operating system may also be used in other embodiments of the present invention rather than using a plugin-control.

Initiating the Overlaying Process

The process of overlaying one or more objects with a window of a window-based application such as a Web browser is initiated according to one embodiment of the present invention either by a user behavior (e.g., clicking on a hyperlink, a banner, or an icon in a document) or by a non-user event (e.g., a timer or timing event). For example, a user behavior may include a click event where the user clicks on a hyperlink, a banner, an icon, or another "hot spot" (an area on the document where a click or other event is defined to trigger an action). Another example of a user behavior is a rollover event where the user moves the cursor over a hyperlink, a banner, an icon, or other "hot spot" in the document. A user behavior may also, in another example, include spending a certain amount of time doing or not doing something such as spending a certain amount of time viewing a document (e.g., viewing a Web page). In this example, the overlaying process may be initiated after the user views the document for a specified period time. A user behavior may also, in another example, include an action such as initiating the display of a document (e.g., a Web page) or initiating a program. In this example, the user action may also initiate the overlaying process.

A non-user event may include, for example, any non-user initiated event such as window-based application initiated event or an operating system initiated event. In one embodiment of the present, a non-user event may include a viewer plugin-control initiated event. A non-user event may, for example, include any sort of time-based event such as a specified time-period expiring after the end of animation or a specified time-period expiring after a document stops loading. For example, 10 seconds after an animation is displayed in the window, a timing event may be generated initiating the overlaying process. In another example, 10 seconds after a window or document (e.g., a Web page or Adobe® Acrobat® document) is loaded, a timing event may be generated initiating the overlaying process. Other non-user events may include, among others, a request to show an object, a request for information from a database, or a request to load a document. For example, a window or document (through a server such as a Web server) may initiate a request to display an object without any user intervention such as in the case of rotating banners. In this example, user behavior may not affect the request for new banners as part of the rotating banner display. In another example, a document or window (through a server such as a Web server) may request, independent of user behavior, information from a database and, thus, initiate the overlaying process. In this example, the information may be requested for a scrolling text display such as stock ticker symbols and prices that are displayed in the document. In another example, a first document may initiate a request for a second document independent of the user behavior and this request for a second document or the loading of the second document may initiate the overlaying process. In this example, a user navigating to a Web page associated with a first URL may be moved by the first Web page to another Web page associated with a second URL where either the request for the second Web page or the loading of the second Web page may initiate the overlaying process. Other non-user events may be based on user attributes and not user behavior. For example, a particular user IP address may initiate the overlaying process.

Figure 9A:
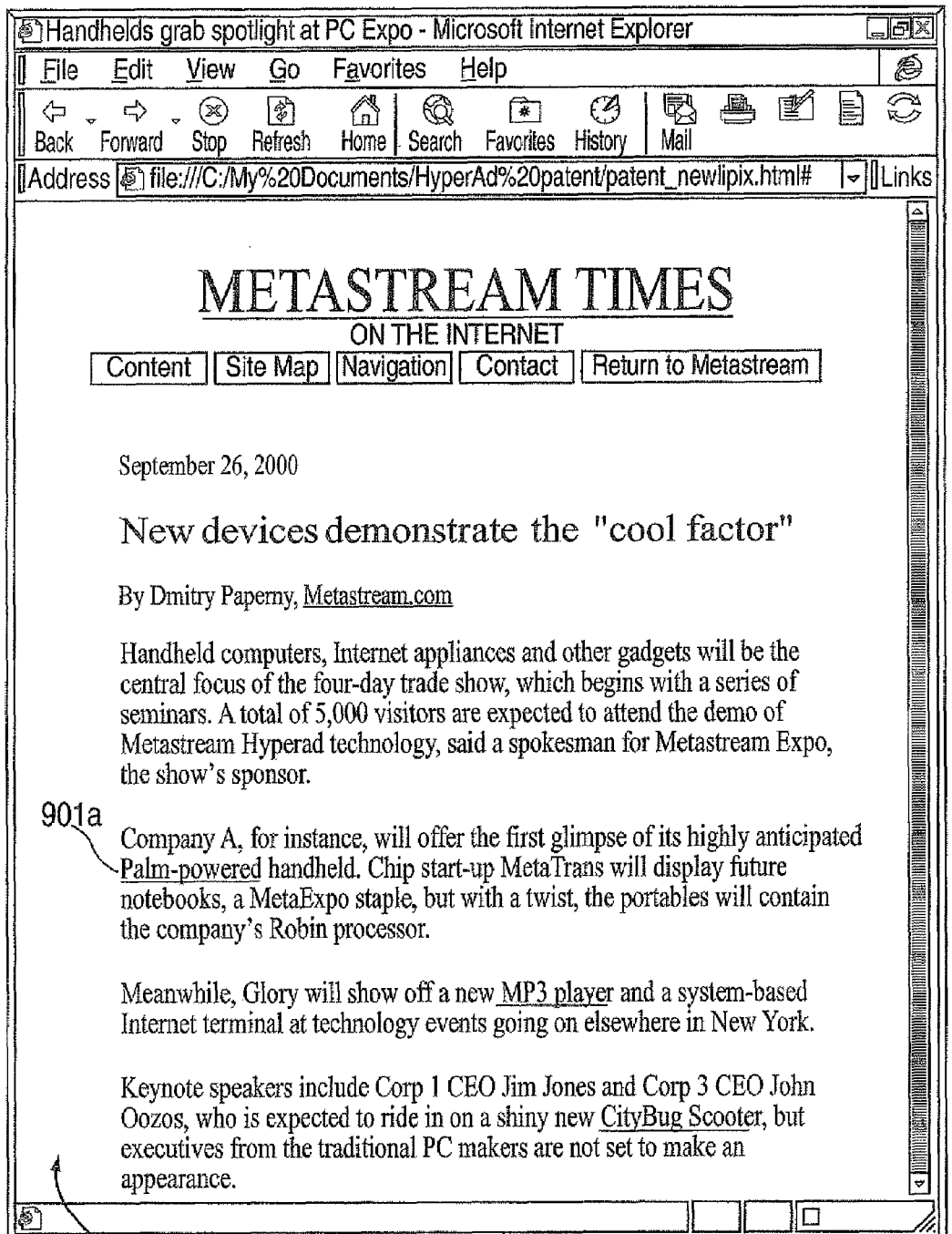
FIGS. 9a-9g are screen images (i.e., screen shots) of a rotating, zoom-out transition of an overlay plane containing an image of a Palm Pilot™ personal digital assistant where the overlay plane is placed in a DHTML layer that is overlaid with a Web page using a viewer plugin-control according to one embodiment of the present invention.
Figure 9B:
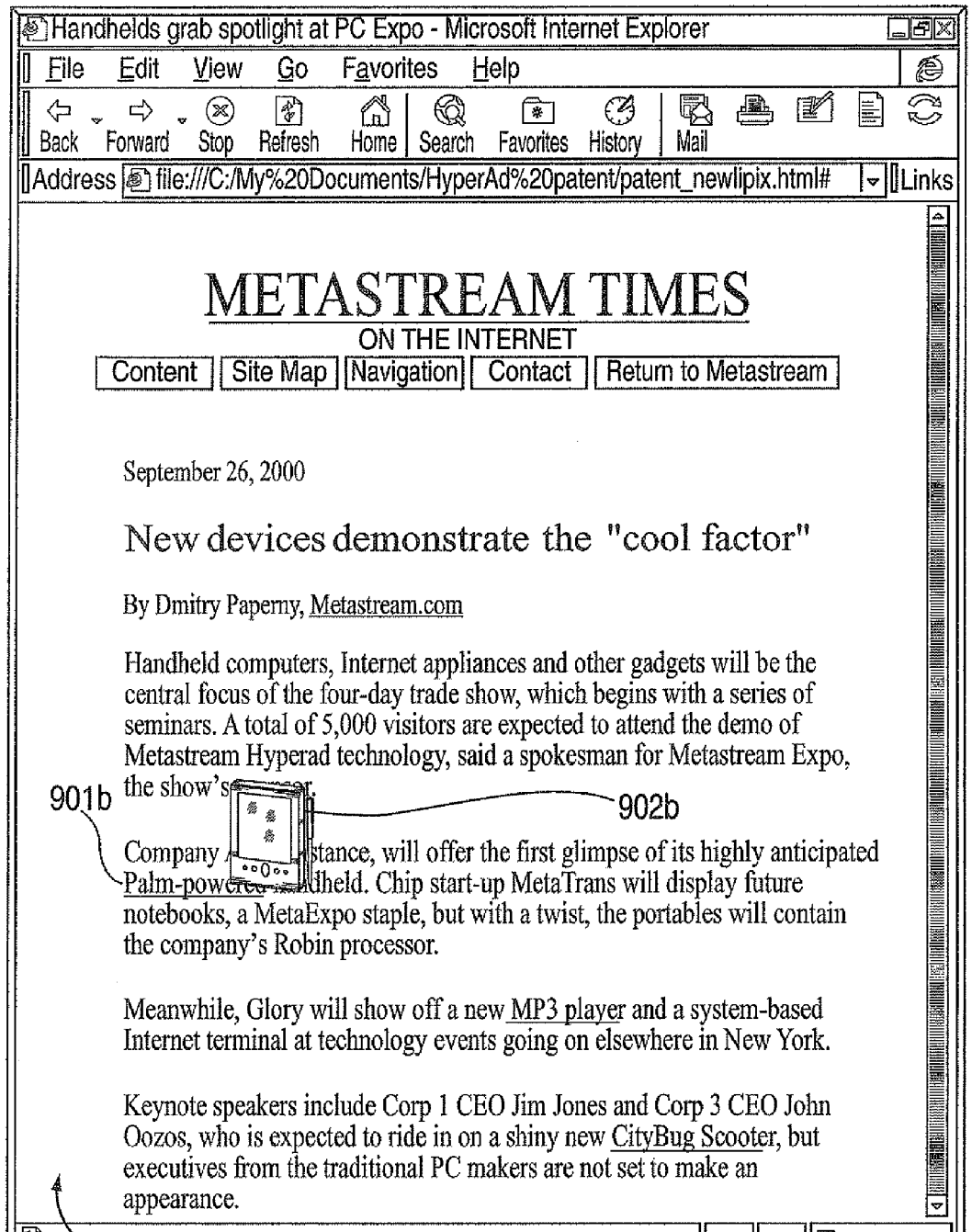
Figure 9C:
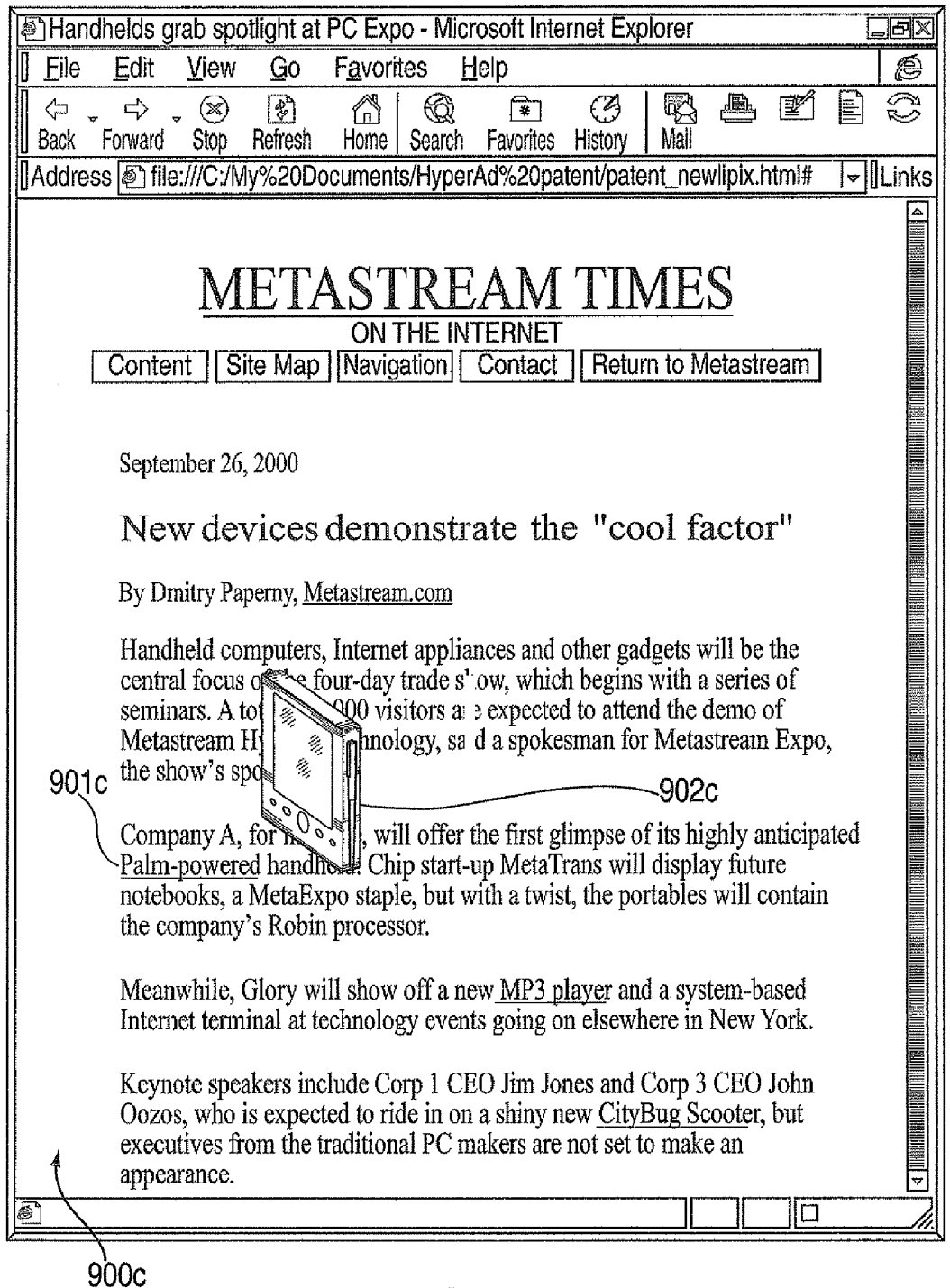
Figure 9D:
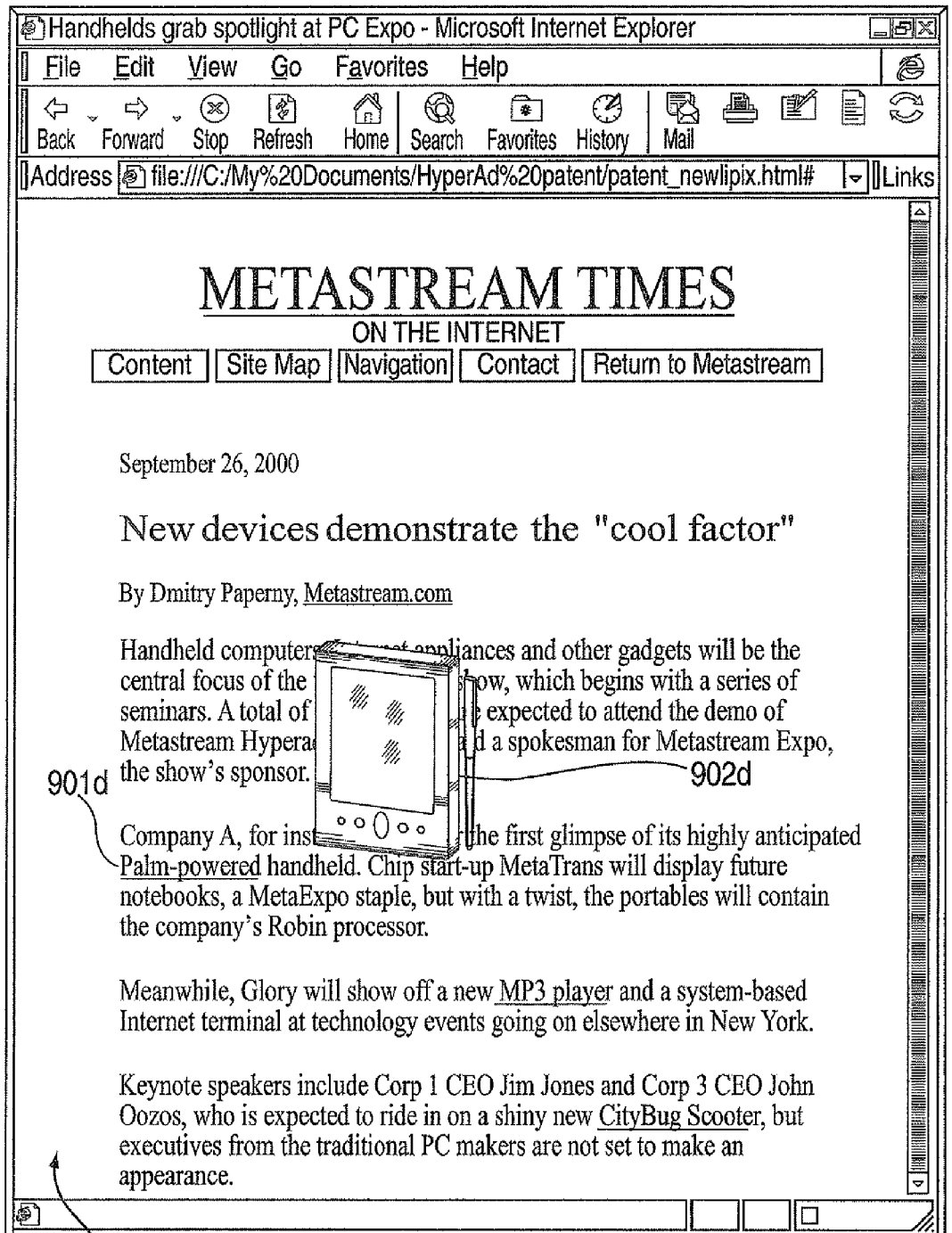
Figure 9E:
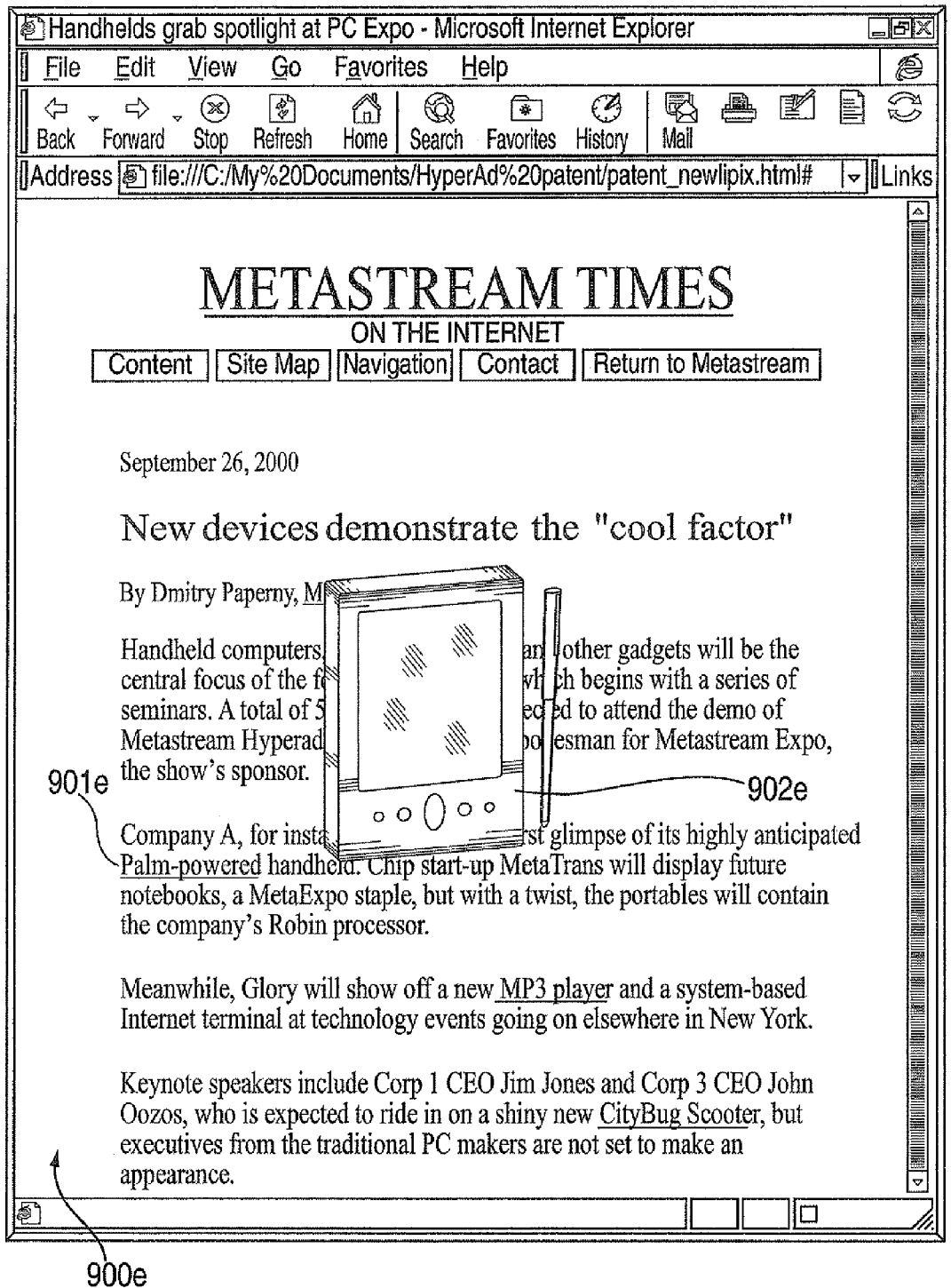
Figure 9F:
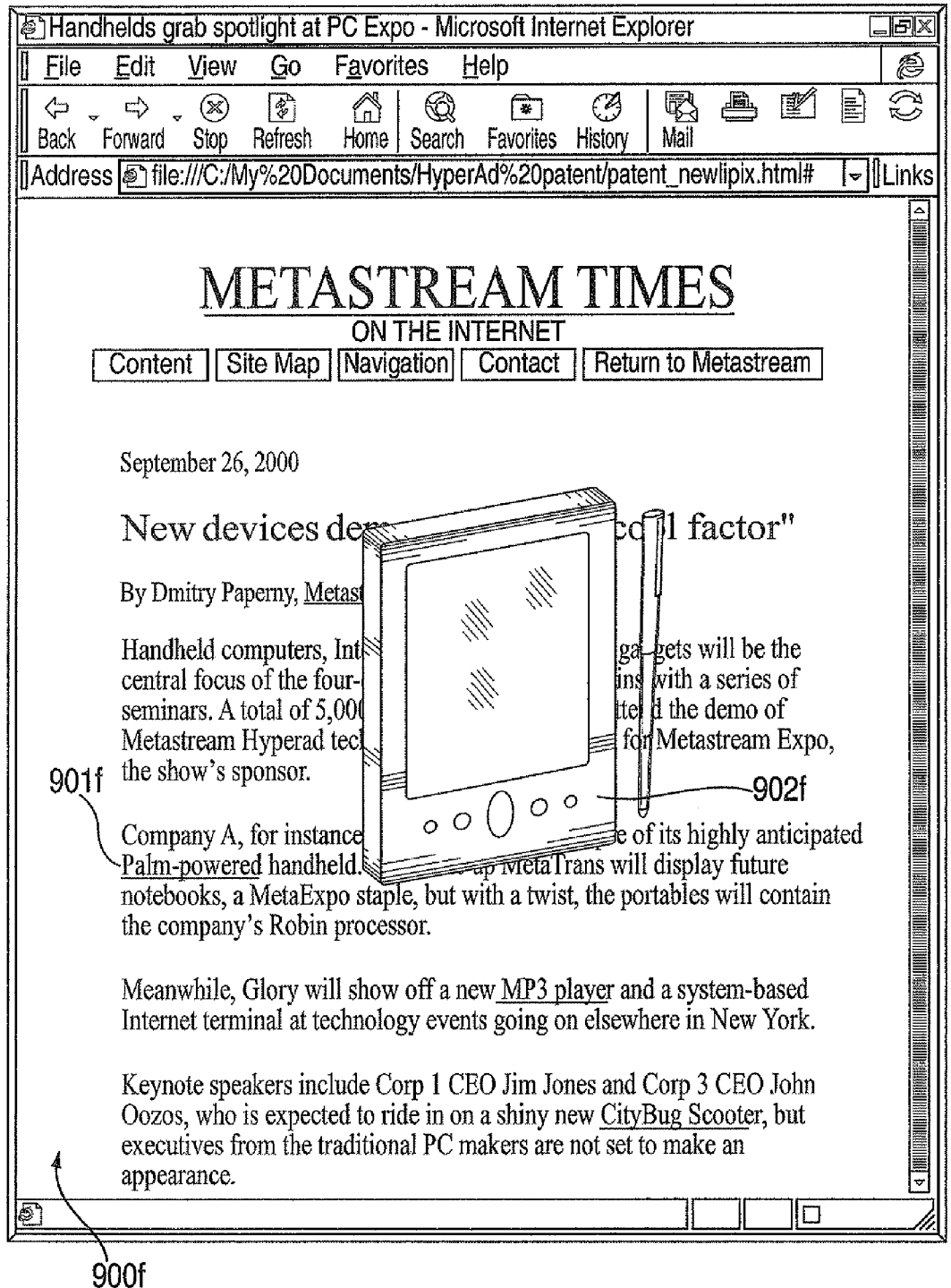
Figure 9G:
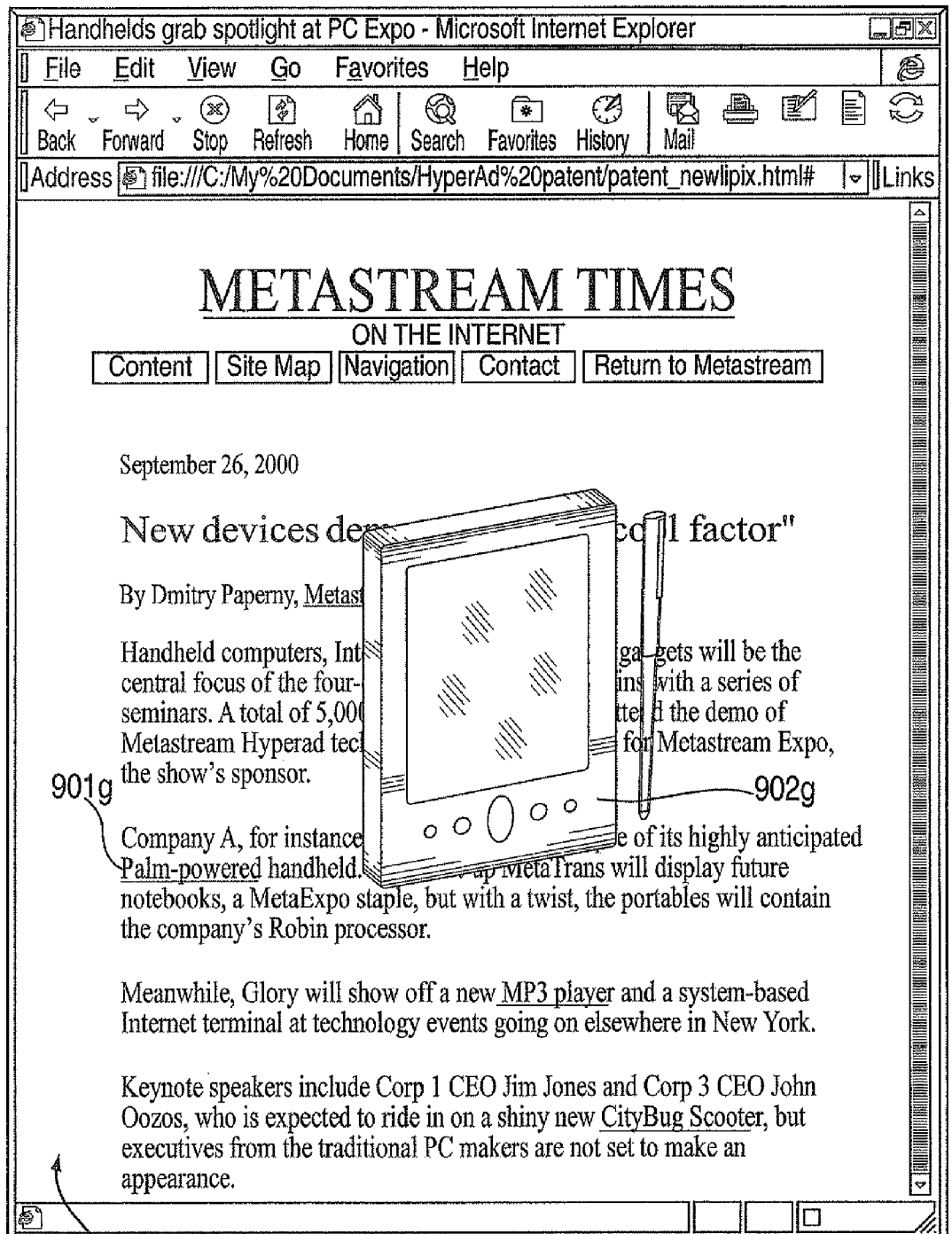

The initiation of the overlaying process refers to initiating the overlaying process for the display of one particular overlay plane. The overlaying process may be generated separately for the display of each overlay plane. According to one embodiment of the present invention, the process of overlaying one overlay plane may be broken down into several separate steps each of which may need to be separately initiated. For example, an overlay plane containing references to the objects (i.e., content) in the overlay plane may be generated but kept hidden from the user when a document or window is first loaded into memory and displayed. Continuing in this example, when a user clicks on a hyperlink, the overlay plane is made visible and the object references are used to begin "streaming" (copying) the object data (i.e., content) to the overlay plane. In this example, the overlaying process is broken down into two steps (i.e., 1) creating a hidden overlay plane, and 2) making the overlay plane visible and streaming the object data) each of which is separately initiated by a different event (document loading and a user click event, respectively). FIG. 9a (discussed in more detail below) shows one embodiment of the present invention where the document is a Web page containing several hyperlinks such as "Palm-powered" 901a. In FIG. 9a, when the Web page is loaded, a hidden overlay plane (in a DHTML layer as discussed later in this specification) may be created. When the user clicks on the "Palm-powered" 901a hyperlink in FIG. 9a, the overlay plane (in the DHTML layer) is overlaid with the Web page as is shown in FIG. 9g. The click event may be a more common user event initiating the overlaying process (or step in the overlaying process) and is therefore discussed in additional detail below.

A click event can occur on a number of objects in a window or document (e.g., a Web page). For example, a click event on a hyperlink (i.e., text associated with a hyperlink) which may appear as highlighted text, such as "hyperlink as text", may be the initiating action for the overlaying process. In another embodiment of the present invention, the overlaying process may be initiated by a click event on a banner displayed on the window. For example, a banner may be any size banner advertisement including the size of the example banner shown below.

Figure 6:
FIG. 6 is an illustration of an example logo that may serve a graphical icon on which a click or other event may initiate the overlaying process according to one embodiment of the present invention.

In another embodiment of the present invention, the overlaying process is initiated by a click event on a graphical icon displayed on the window. For example, the graphical icon can be any size of image including a symbol such as "☺", a logo (an example of which is shown in FIG. 6), and a picture. FIG. 6 is an illustration of an example logo that may serve as a graphical icon on which a click or other event may initiate the overlaying process according to one embodiment of the present invention. Another embodiment of the present invention initiates the overlaying process by a click event on a "hot spot" (an area on the window in which a particular action is defined for an event) on the window or in a document. For example, a click event on the lower right quadrant of a mostly blank window may initiate the overlaying process.

The present invention may use any conventional or hereto unknown future method of overlaying (i.e., drawing) an object with a window or document (e.g., compositing). In one embodiment of the present invention, a method for compositing described in co-pending U.S. patent application Ser. No. 09/620,942 with a filing date of 21 Jul. 2000 and title "Method and System for Displaying a Composited Image" the entire specification and disclosure of which is expressly incorporated herein by reference may be used. According to this embodiment of the present invention, multiple buffering without a Z-buffer where at least one of the multiple buffers is implemented in addition to the window's host program (i.e., the window's container) may be used to composite the overlay plane (i.e., the layer or object) with the window in order to create a "composited image." The embodiment just described may apply where the window is a Web page in a Web browser host program. In this situation, the embodiment of the present invention may use two Web browser provided buffers (i.e., one off-screen buffer termed the "back buffer" and an on-screen buffer termed the "front buffer") and at least one auxiliary buffer allocated by a plugin-control to compose and draw the composited image.

Determine if Viewer is Present

Figure 8A:
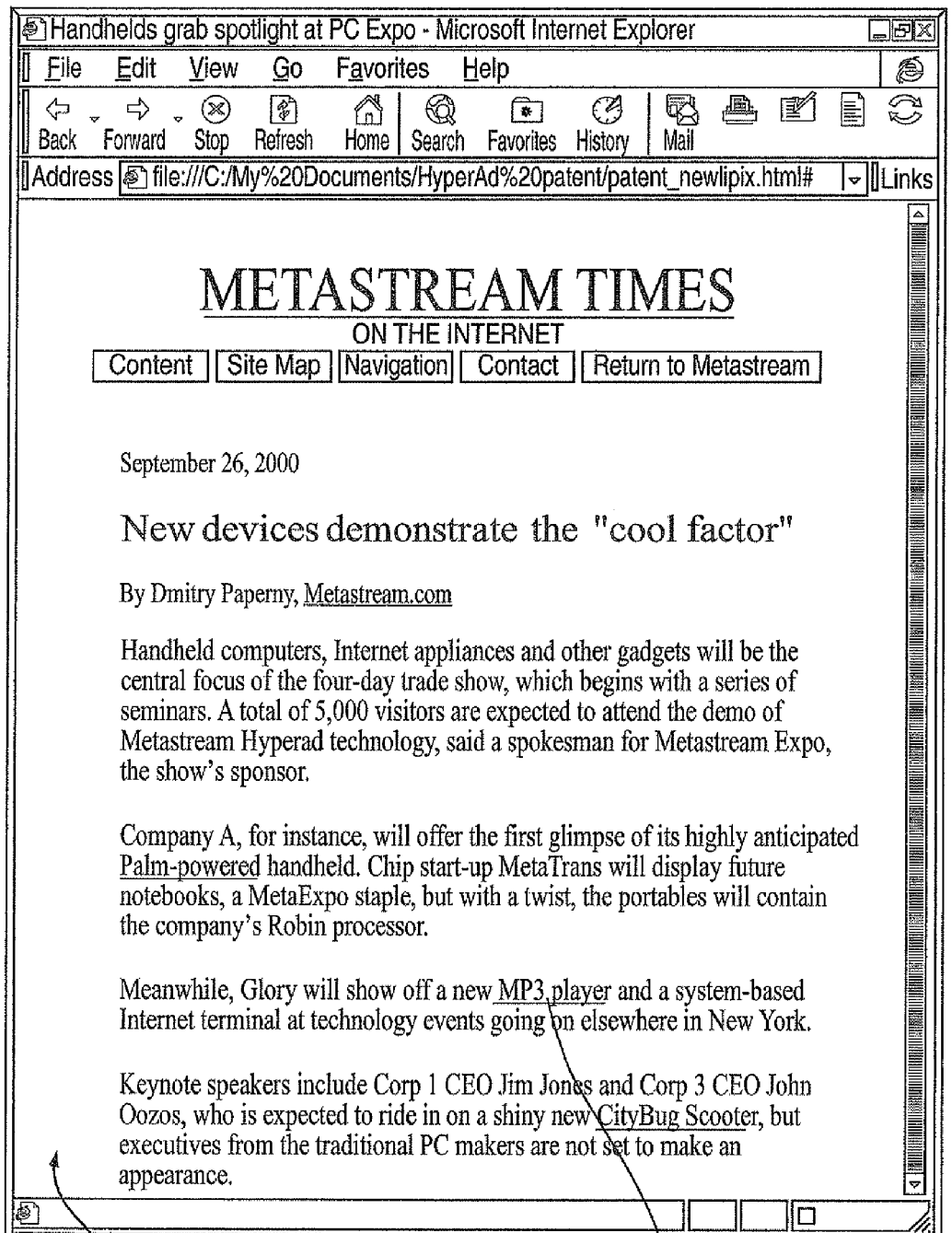
FIGS. 8a-8e are screen images (i.e., screen shots) of a transparent transition of an overlay plane containing an MP3 player image overlaid with a Web page using a viewer plugin-control according to one embodiment of the present invention.
Figure 8B:
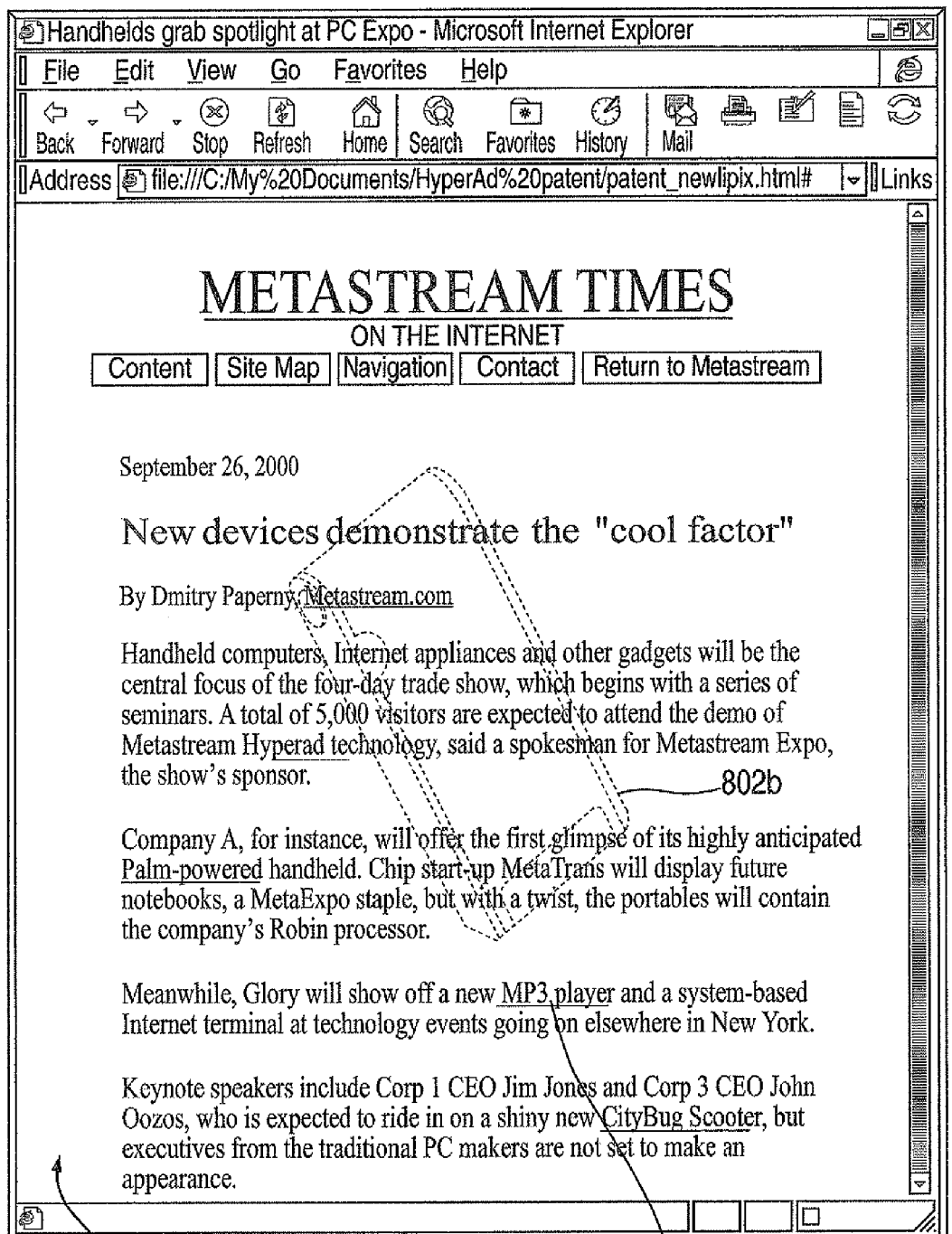
Figure 8C:
Figure 8D:
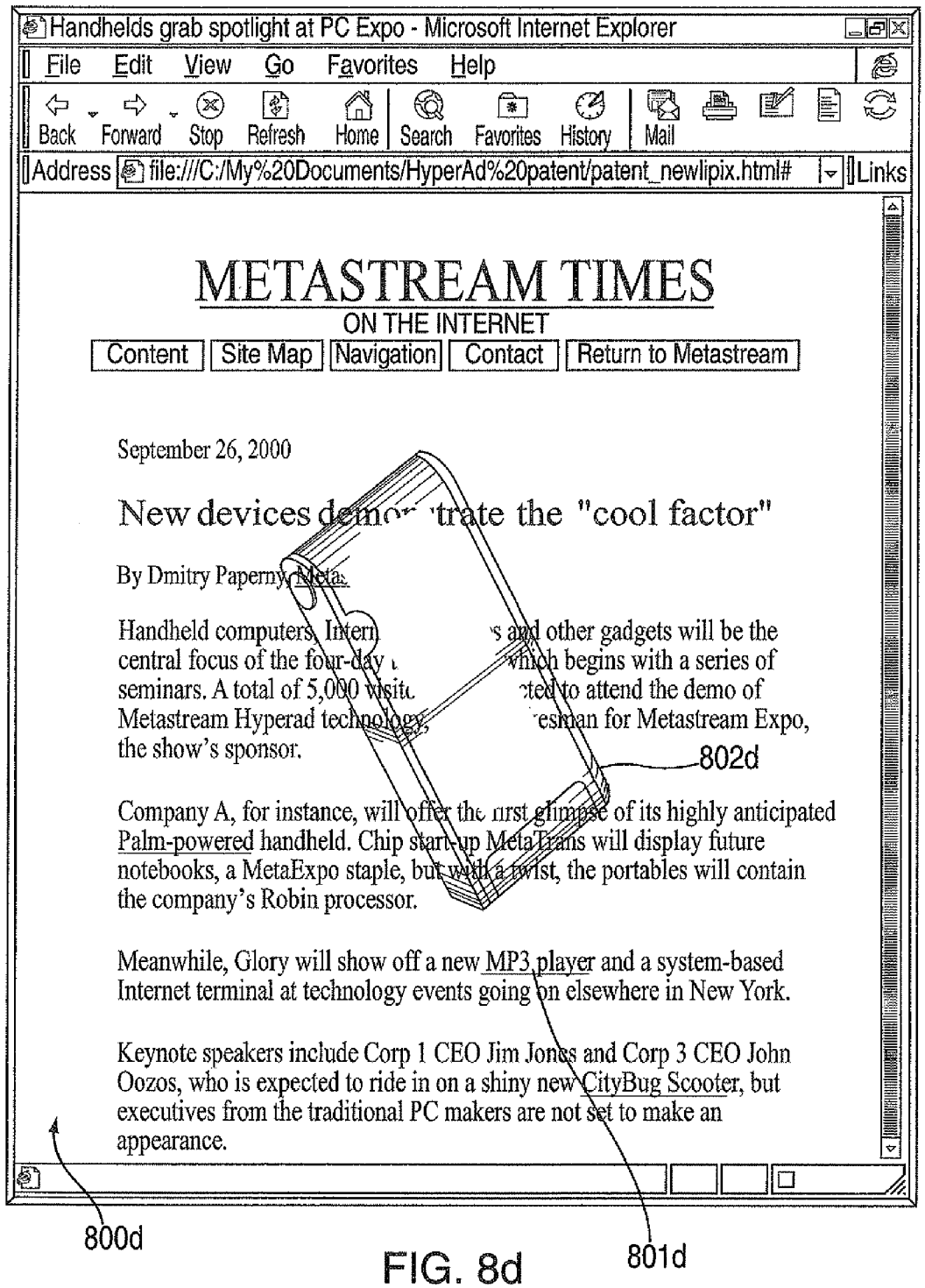
Figure 8E:
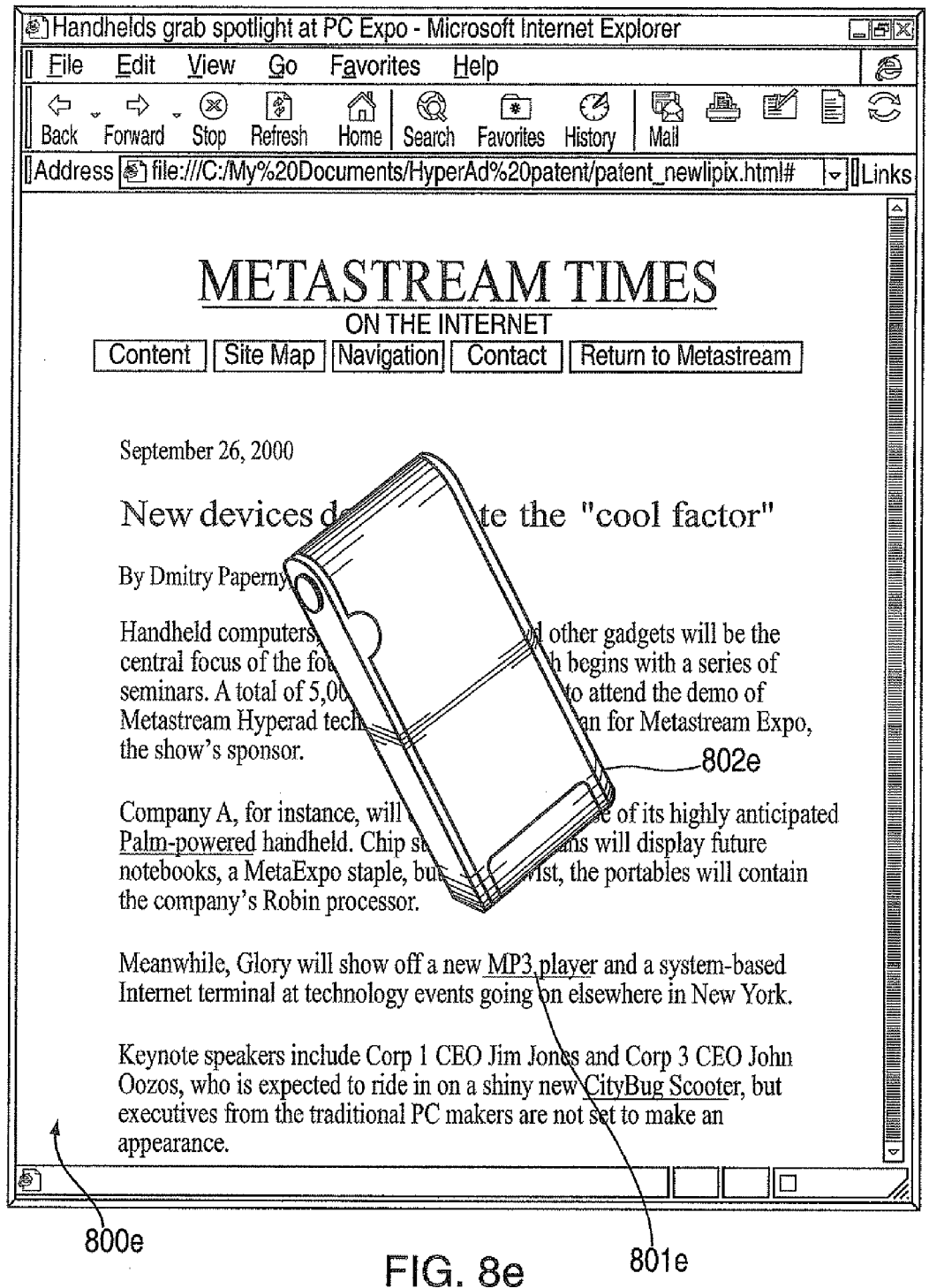

The overlaying process may begin with either an attempt to instantiate the viewer plugin-control, a determination of whether an instance of the viewer plugin-control exists (and is, therefore, available), or both according to one embodiment of the present invention where a viewer plugin-control is used. If an instance of the viewer plugin-control can not be instantiated and is not available, the present invention may implement similar functionality using alternate means. In one embodiment of the present invention, an image such as a GIF or JPEG of the object(s) to be overlaid (i.e., the overlay plane) may be placed in a DHTML layer and the layer integrated with the window using the window-based application layering features. For example, an alternate GIF of the object plane may be available and can be placed in a DHTML layer of Internet Explorer where Internet Explorer handles the drawing of the layer with the Web page (i.e., browser window). In other embodiments of the present invention, a DHTML layer may be used for the present invention rather than for the display of an image when a viewer plugin-control can not be instantiated or is not available. FIG. 8e is a screen image (i.e., a screen shot) of an overlay plane containing an MP3 player overlaid with a Web page using a viewer plugin-control according to one embodiment of the present invention. In an alternative embodiment where an instance of the viewer plugin-control can not be instantiated and is, therefore, not available and using FIG. 8e as an example, an alternative and less advantageous effect may be achieved by having a GIF image of the MP3 player, placing the image in a DHTML layer, and having the Web browser draw the layer with the Web page. This alternative embodiment may be advantageous because it uses a lower quality image (e.g., a GIF image) rather than the possible innovative methods for drawing available to the viewer-plugin control embodiment of the present invention. In one example, the innovative drawing techniques specified in co-pending U.S. patent application Ser. No. 09/620,942 with a filing date of 21 Jul. 2000 and title "Method and System for Displaying a Composited Image" the entire specification and disclosure of which is expressly incorporated herein by reference may be used.

As previously stated, according to one embodiment of the present invention, the overlaying process may begin with either an attempt to instantiate the viewer plugin-control, a determination of whether an instance of the viewer plugin-control exists (and is, therefore, available), or both. According to one embodiment of the present invention, a script such as a Java or Visual Basic script, program, file, or module may be used to determine if the viewer plugin-control is present. FIG. 3 is an example Visual Basic script that detects whether an ActiveX control exemplary embodiment of the present invention viewer plugin-in control already exists. In the example Visual Basic script according to one embodiment of the present invention shown in FIG. 3, the function ie_detect returns a value indicating whether a particular instance of an ActiveX viewer plugin-control exists. The ie_detect function begins by setting its return value to a default of 2 (333), highlighted by arrow 1 on FIG. 3, indicating that the script is not able to instantiate the viewer plugin-control according to the version of the scripting engine available to the end-user 332. The ie_detect function then determines 345 whether the version of the Visual Basic scripting engine being used supports the viewer plugin-control instantiation by examining the version of the Visual Basic scripting engine available to the end-user 345. For example, the CreateObject method (i.e., function) 375, used by the embodiment of the present invention shown in FIG. 3, is supported by VBScript (i.e., Visual Basic Scripting) version 2 and later. Therefore, for example, the ie_detect function determines whether the Visual Basic Scripting engine version is 2 or greater 345. If the scripting engine does not support CreateObject 375 for object instantiation (i.e., the scripting has a VBScript version less than 2), ie_detect will return the value of 2 previously set as the default on line 333 in FIG. 3. If the scripting engine does support CreateObject, the value returned by the ie_detect function is changed to a new default value of 1 (354), highlighted by arrow 2, indicating that the viewer plugin-control object was not successfully instantiated. The CreateObject method (i.e., function) 375 is used to attempt the instantiation of the viewer plugin-control as indicated by arrow 4. The success of this instantiation is determined by testing for the existence of the new viewer plugin-control object 384 as shown by arrow 5. If the new viewer plugin-control object exists (i.e., the instantiation was successful), the ie_detect return value is set to 0 (i.e., zero) 394 as shown by arrow 3, indicating that an instance of the viewer plugin-control exists. If the new viewer plugin-control does not exist (i.e., was not successfully instantiated), the previously set (see arrow 4) value of 1 (354) is returned by the ie_detect function.

Object (Content) to be Overlaid

The content to be overlaid according to the present invention may be any type of media object, such as text, animation, two-dimensional (2D) or three-dimensional (3D) graphics, movies, sound, and pictures. Data for the object may be contained in one or more files which, according to one embodiment of the present invention, may be accessed by a viewer plugin-control. In one embodiment of the present invention the object data is stored in two files where the first file contains the formatting (e.g., location and other layout) information for the data, while the second file contains the actual content data. The formatting data (i.e., the first file) may be stored in a markup language based document such as an XML or HTML file. The formatting information is used by the present invention to properly display the actual content data. The data file (e.g. the second file) may be a binary or compressed binary file and may contain the content data. Other embodiments of the present may use a different number of files each containing exclusively or in combination formatting and actual content data for the media content to be overlaid.

FIG. 4 is an example XML document containing the formatting information for the content (i.e., the object) to be overlaid with the window by a viewer plugin-control according to one embodiment of the present invention. The XML markup language instructions may specify the formatting information for the scene to be created before it is overlaid with the window. For example, the camera location 412-415 and viewpoint 418 (both may be important in determining how a scene should be constructed and presented to a user) are specified in section one (marked with a bold line and the number 1 enclosed in a circle) 412-421 of the XML file.

Specific formatting information about the object (or objects) may also be identified as is shown in section two 424-460 of the XML file. One example of this object formatting information is the transformation information for the object that is identified in section three 433-442 of the XML file. Other formatting information such as streaming and timing data may also be included in the XML file. Section four 463-478 provides an example of some streaming information for the images in the scene. As previously stated, according to one embodiment of the present invention, the formatting information is contained in the XML file while the actual content is contained in one or more additional files which may be in binary or compressed binary format.

According to one embodiment of the present invention, if for some reason the viewer plugin-control is not correctly instantiated, an alternate image file may be specified and displayed as a backup means for overlaying information with the window. For example, a source object such as an image in JPEG or GIF format may be substituted for the viewer plugin-control content where no available instance of the viewer plugin-control exists. This source object may offer considerably less than the viewer plugin-control in terms of appearance, content, animation, and effects but, however, it may solve the potential instantiation problem and it avoids distracting the user with error messages or by creating additional delays while another attempt is made to generate a new instance of the viewer plugin-control.

According to another embodiment of the present invention, the content may be displayed using features inherent in the window-based software or the operating such as, for example, DHTML layers. In this embodiment, formatting and content data may also be stored in one or more files as previously discussed. Problems with instantiation are not generally a concern with this embodiment (unless of course it is related to the inherent software feature relied upon) and, therefore, a backup means for alternate content display may not be required.

Multimedia Integration

Figure 7:
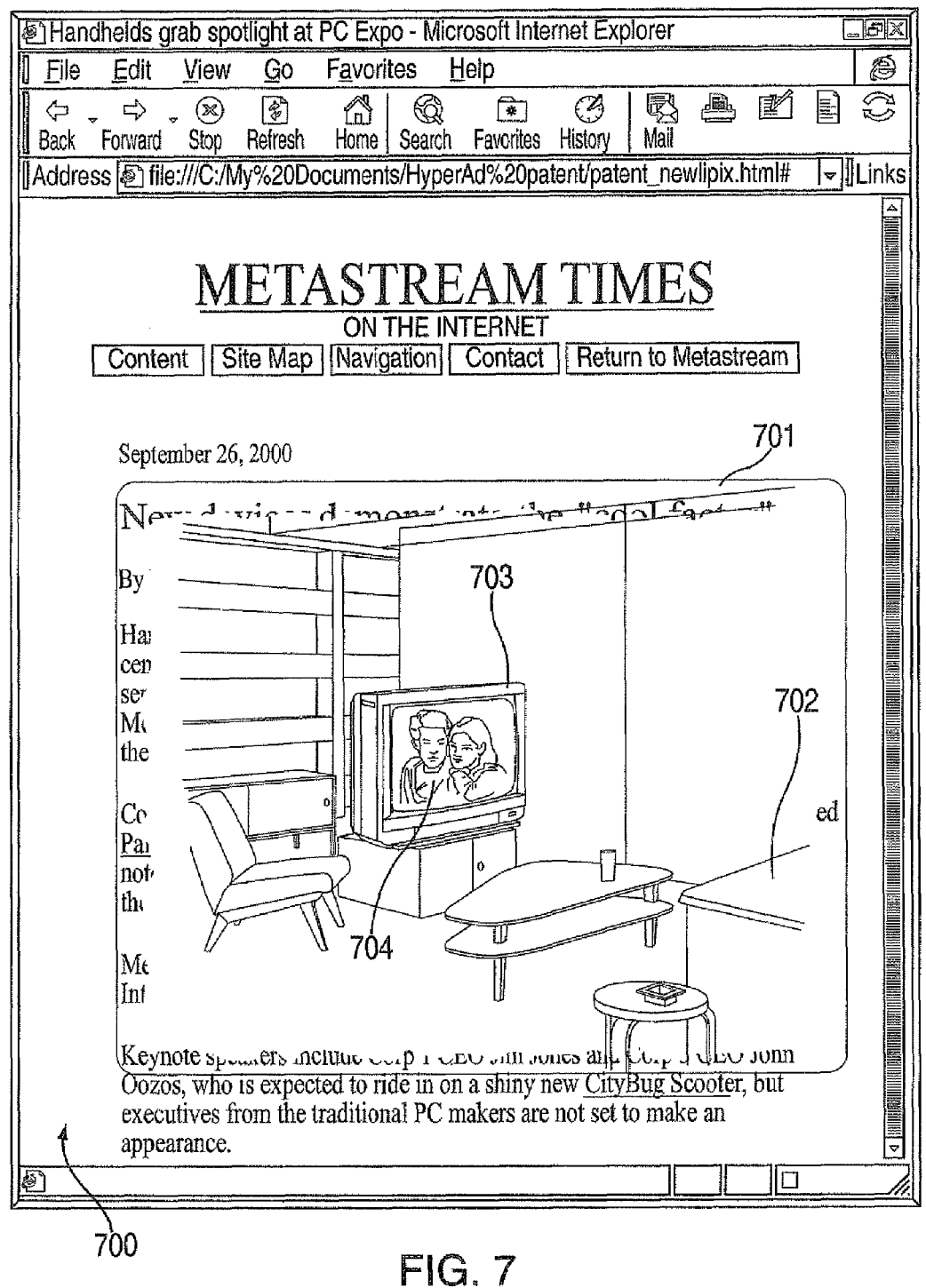
FIG. 7 is a screen image (i.e., a screen shot) of a Web browser with overlaid multimedia integration according to one embodiment of the present invention.

In one embodiment of the present invention, media objects may be overlaid on top of each other. For example, a first object, an animation, containing a television screen may be overlaid on top of a Web page while a second object, a movie, may be overlaid on top of the animation so that the movie is running on the screen of the television in the animation. FIG. 7 is a screen image (i.e., a screen shot) of a Web browser with overlaid multimedia integration according to one embodiment of the present invention. In FIG. 7, the Web browser displays a Web page 700 which has a scene (i.e., an overlay plane) overlaid above the text of the page. This scene consists of an iPIX® (Internet Pictures Corporation) 360° panoramic image converted into an image 701 usable by the present invention. The scene may contain 3D images such as a dresser 702 that are part of the original iPIX® image. The scene may also contain numerous forms of additional content such as 3D images shown in FIG. 7 by the inclusion of a 3D image of a television 703 which has been added to the converted iPIX® picture. Another example of additional content is video content 704 playing into some texture area which may consist of one or more polygons such as the screen area 704 of the television 703. In one embodiment of the present invention, iPIX® and QuickTime VR™ panoramas are converted (either at authoring time or at display time) by the viewer plugin-control into a viewer plugin-control format panorama images for use in the overlaying process. The edges of the overlay plane (i.e., the scene) shown in FIG. 7 are semi-transparent to showcase that the overlay plane is not rendered in place of the underlying text as is conventionally done when an image is placed on a window (such as a Web page, Adobe® Acrobat® document, PDA-based software screen, or e-book screen) but instead, the overlay plane is overlaid on top of the text. The use of semitransparent and transparent "soft edges" (which may also be termed "feathered edges") is another unique feature of the present invention.

The overlaying of the scene (i.e., overlay plane) may either be accomplished without using any inherent feature of the window-based application (e.g., a Web browser) or may use window-based application features such as the support of DHTML (Dynamic HTML) layers regardless of whether the embodiment of the present invention uses a viewer plugin-control. This overlaying of objects on top of each other may be done using the layering feature of the window-based application (e.g., a Web browser) where layering is specifically provided for. Where layering is specifically supported by the window-based application, the overlaying of objects may be performed in a single layer or in multiple layers which are then integrated with the window (e.g., a Web page, Adobe® Acrobat® document, PDA-based software window, or e-book screen). Alternatively, in one embodiment of the present invention, whether or not layers are supported by the window-based application and whether or not the layering feature of the window-based application is used, this overlaying of objects may be performed directly with the underlying window as described in co-pending U.S. patent application Ser. No. 09/620,942 with a filing date of 21 Jul. 2000 and title "Method and System for Displaying a Composited Image" the entire specification and disclosure of which is expressly incorporated herein by reference. In another embodiment of the present invention, alternative methods for compositing, overlaying, or layering may also be used either in conjunction with the layering feature of the window-based application or in place of a layering feature of the window-based application. These alternative methods may be used in place of a layering feature where the window-based application either does or does not support layering.

The integration of different media by overlaying one media object on another is both useful and novel according to present invention. According to one embodiment of the present invention, any type of media object, such as text, animation, 2D or 3D graphics, movies (with or without audio), audio, and pictures, may be overlaid with any other media type in the same media space. For example, a picture may be overlaid on a 3D graphics image to generate a new scene that is in turn overlaid on a window (e.g., Web page, Adobe® Acrobat® document, PDA-based software window, or e-book screen). Other conventional technologies such as transparent ActiveX controls may to some degree accomplish a part of what the present invention accomplishes, however, these conventional technologies rely on the underlying window-based program (e.g., Web browser) features and are therefore restricted to the processing speed and cross-platform compatibility of the underlying program. In one embodiment, the present invention does not rely on the features of the underlying window-based program and may therefore optimize the overlaying process (i.e., optimize drawing speed) and achieve greater cross-platform compatibility with other window-based applications. For example, co-pending U.S. patent application Ser. No. 09/620,942 with a filing date of 21 Jul. 2000 and title "Method and System for Displaying a Composited Image" describes one embodiment of the present invention where drawing may be done outside the window-based application to speed up the drawing of the overlay plane (termed "compositing plane" in U.S. patent application Ser. No. 09/620,942).

In one embodiment of the present invention, the overlay plane is itself interactive and may contain its own hot spots, hyperlinks, banners, and graphical icons that may in turn initiate a second level overlaying process whereby a second overlay plane is overlaid on the first overlay plane. For example, in FIG. 7, when the overlay plane is first displayed, the screen 704 of the television 703 may be a blank "hot spot" that when clicked on by a user initiates the overlaying of a video, as a second overlay plane, into the texture area of the screen 704. In one embodiment of the present invention, any number of overlay planes levels may be used to achieve the Web page operator's or owner's desired result. In another example, an overlay plane may contain particular text that is used to cause by, for example, a user event such as a mouse rollover on the particular text, another, second overlay plane to appear with a text annotation to the particular text contained in the first overlay plane. In one embodiment of the present invention, the interactive nature of the overlay plane and the multiple levels of overlay plane usage is independent of any multi-layering functionality made available by the window-based application for whose window the overlaying is being performed.

Figure 10F:
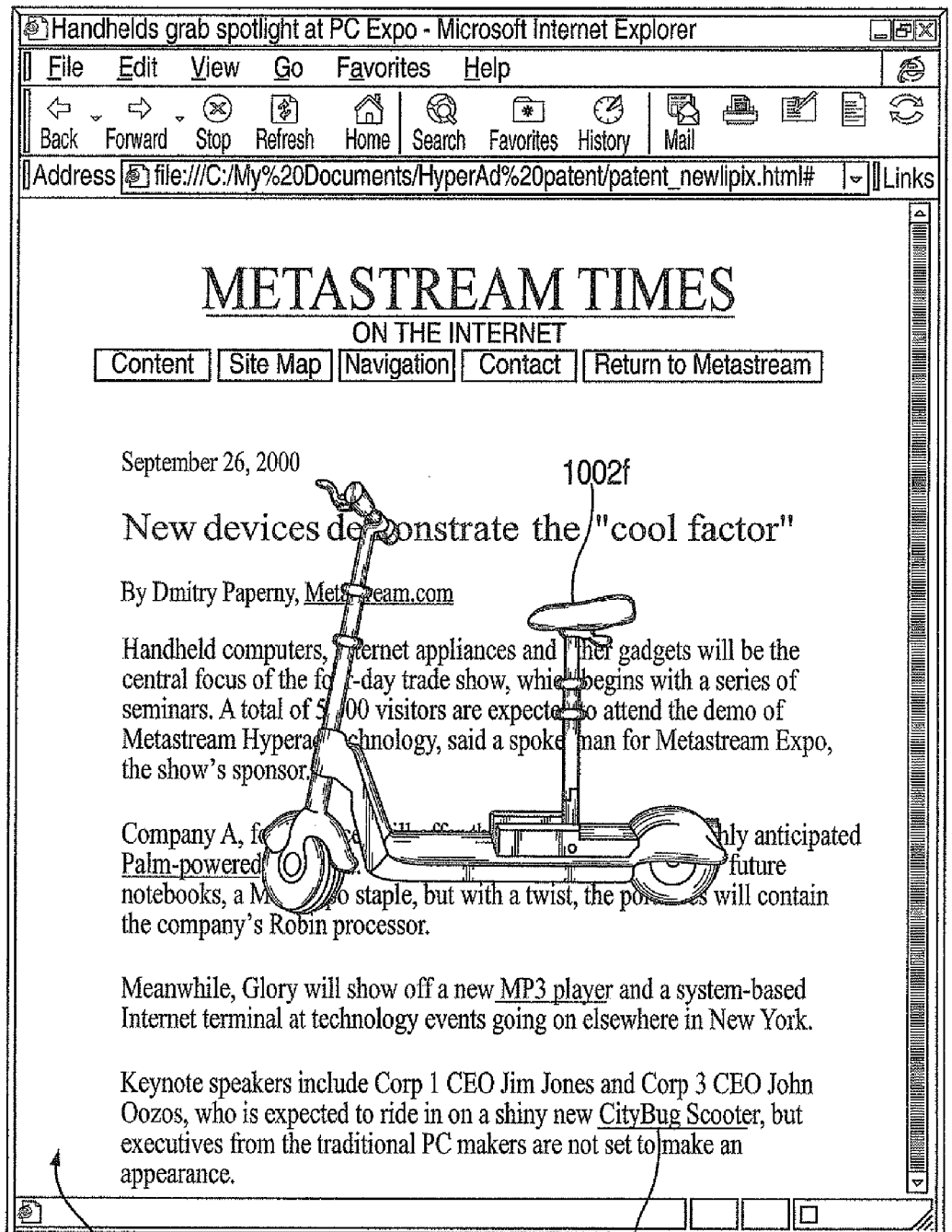
Figure 11A:
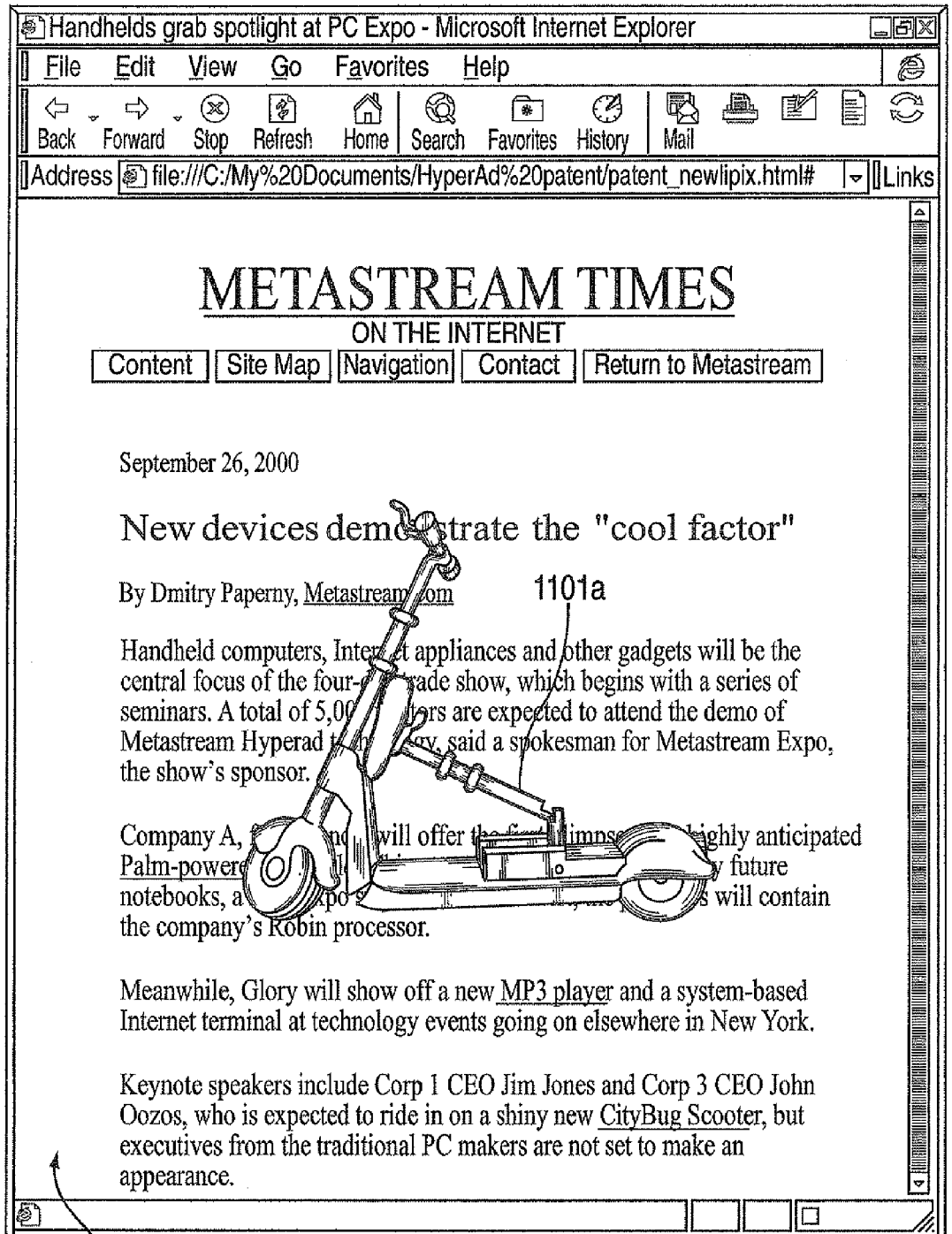
FIGS. 11a-11b are screen images (i.e., screen shots) illustrating an example of an interactive overlay plane where the overlay plane is animated (i.e., performs an animation) in response to a user action such as clicking on the overlay plane according to one embodiment of the present invention.
Figure 11B:
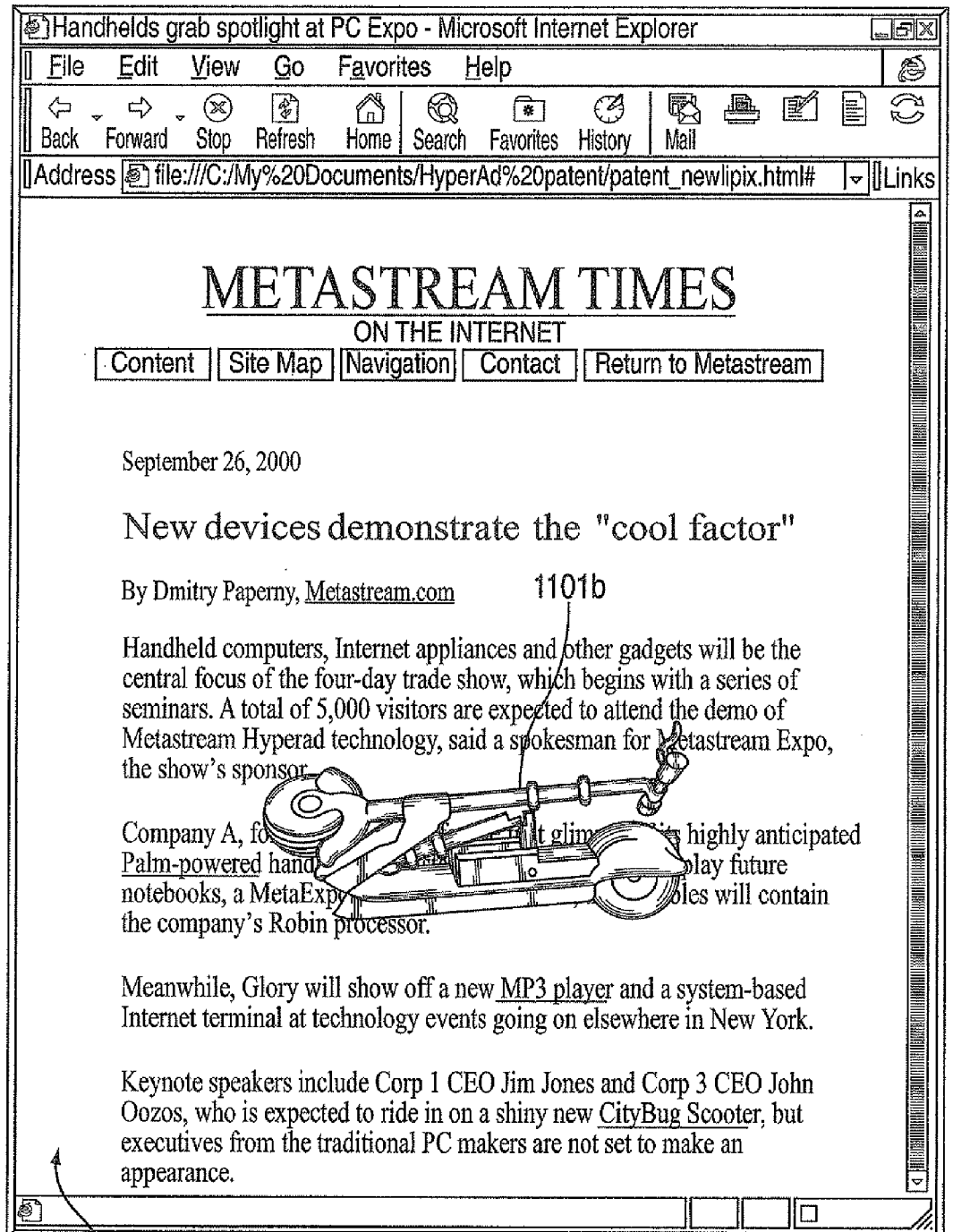

FIGS. 11a-11b are screen images (i.e., screen shots) illustrating an example of an interactive overlay plane where the overlay plane is animated (i.e., performs an animation) in response to a user action such as clicking on the overlay plane according to one embodiment of the present invention. FIGS. 11a-11b display a Web page (i.e., a window) 1100a-1100b containing an overlay plane of a scooter 1101a-1101b displayed on top of the Web page. According to the example displayed in FIGS. 11a-11b, when the user clicks on the overlay plane scooter, an animation of the scooter object runs where the scooter folds down and then reopens. FIG. 10f displays the scooter fully displayed before this example animation begins. In this example, when the user initiates the animation in the interactive overlay plane, the scooter begins to fold 1101a as is first shown in FIG. 11a and continues folding until it is fully folded 1101b as is shown in FIG. 11b. In this example, the user clicking on the folded scooter 1101b shown in FIG. 11b may initiate an animation whereby the animation unfolds. The example shown in FIGS. 11a-11b of an interactive feature in the overlay plane is one of many possible interactive features that may be incorporated into the overlay plane and should not be construed to limit the implementation of interactive features.

Layering and Layers

According to one embodiment of the present invention, the object(s) to be overlaid with the window may be arranged in an overlay plane that is contained in one or more layers of the window-based application (e.g., a DHTML Web browser layer) wherein the use of layers is a feature provided for by the window-based application or operating system. In one embodiment of the present invention, this layer or layers may be established when the window (e.g., Web page, Adobe® Acrobat® document, PDA-based software window, or e-book screen) is first loaded by the window-based application and the window setup information (e.g., the window's/document's markup language commands) is interpreted. According to this embodiment, the layer may be hidden until some user behavior or non-user event occurs (e.g., a user clicking on a hyperlink, banner, or graphic icon) that initiates the overlaying of the layer with the window. At this time, the layer becomes visible and is overlaid with the window. In one embodiment of the present invention where a hidden layer is used, the data for the object(s) in the overlay plane may be copied ("streamed") to the layer when the hidden layer is first created. In this embodiment, the objects are "pre-fetched" meaning they have been retrieved in advance of when they may be needed. In another embodiment of the present invention where a hidden layer is used, references for the object(s) in the overlay plane may be included in the layer at the time the hidden layer is created and the actually streaming of the object data may not occur until some user behavior or non-user event initiates the overlaying of the layer with the window.

In another embodiment of the present invention, the layer may be generated after some user behavior or non-user event occurs initiating the overlaying process. In this embodiment, the overlay plane and layer may be generated together, the streaming of the object data may occur, and the layer (containing the overlay plane) may be made visible to the user. In an alternative embodiment of the present invention, the viewer plugin-control may generate an overlay plane outside of the window-based application when a window (e.g., Web page, Adobe® Acrobat® document, PDA-based software window, or e-book screen) is first loaded by the window-based application and the window set information (e.g., the markup language commands) is interpreted. For example, the loading of the window may generate a process (separate from the window-based application process(es)) that creates the overlay plane in memory and may store the overlay plane in a storage device (or keep the overlay plane in memory) until some behavior or event occurs triggers the overlaying process and calls for this information in order to overlay it with the window (e.g., Web page, Adobe® Acrobat® document, PDA-based software window, or e-book screen) of the window-based application (e.g., the Web browser).

FIG. 5 is an example of the HTML language commands for incorporating an object as a layer in the Web browser example of a window-based application referenced here according to one embodiment of the present invention. In the example embodiment shown in FIG. 5, a hidden layer identified as "Scooter" is defined and positioned on the Web page 506-534. The hidden layer contains an object defined within the <object . . . > 509 and </object> 531 HTML tags. As stated earlier, the object information is defined using two files according to one embodiment of the present invention. The first file is a markup language file containing the instructions on items such as the screen parameters, camera location, object location, texture location, and animation. The markup language file contains all the information about where and how to place the object data on the layer and may be viewed as the map for the object data. For example in FIG. 5, this markup language file is identified as "scooter.mtx" 519 and is, according to this example, an XML file (the scooter.mtx file is not shown). The second file may be a binary file or files containing the actual media content, geometry, textures, and vectors of the object. This second binary file may be of a compressed binary format in order to reduce the amount of space used by the file. Using the FIG. 5 example, the media content file (which may be in a compressed binary format) associated with the scooter.mtx markup language file is "scooter.mts". The media content file is generally not identified in the window markup language file (partially shown in FIG. 5) but is referenced in the overlay plane markup language file (e.g., scooter.mtx which is not shown). FIG. 10f is a screen image (i.e., a screen shot) showing the scooter.mts media content overlaid with a Web page according to the directions contained in the scooter.mtx file. In another example, FIG. 4 shows the contents of a different overlay plane markup language file, named "teapot.mtx" (similar to the scooter.mtx file not shown), that contains information about camera viewpoint and location, transformation, texture mapping, and streaming for the described scene. For example in FIG. 4, the media content file (which may be in compressed binary format) is identified as "teapot.mts" 463, 472. In the example shown in FIG. 4, the "teapot.mtx" XML file maps the information in the "teapot.mts" media content file (not shown because it contains binary data). As previously stated, both the XML layout (i.e., content mapping file) and the media content files may be specified in the hidden layer shown in first part of the example HTML markup language code illustrated in FIG. 5.

The second section of the example HTML markup language code shown in FIG. 5 displays the event handling that makes the hidden layer visible to a user. The OnMouseOver event 545 allows a rollover effect to be specified for the hyperlink, banner, or graphic image (e.g., a button) that initiates the overlaying process. The OnMouseOut event 542 allows another effect to be specified (in this case the restoration of the original state) once the mouse is no longer over the hyperlink, banner, or graphic image that initiates the overlaying process. The OnClick event causes, according to one embodiment of the present invention, the hidden layer to become visible and overlaid with the window. Other events (not shown) may cause the visible layer to become hidden again.

In another embodiment of the present invention, an overlay play may be created in a layer that is made visible on the initial loading and display of the window (e.g., Web page, Adobe® Acrobat® document, PDA-based software window, or e-book screen). In this embodiment, a user event or non-user event may cause the layer to become hidden. This alternate embodiment is the opposite of previously discussed embodiments where the overlay plane is added to the window. In this embodiment of the present invention, the overlay plane contains information that is not added but is removed due to some user or non-user event.

The use of layers provides an advantageous embodiment of the present invention because a layer can be used to place additional content on top of the window content without necessitating the recompilation of the information. This provides a rapid method of overlaying the layer contents with the window contents. Additionally, multi-layering can be used to provide enhanced overlaying of content. For example, according to one embodiment of the present invention, the first layer created for the viewer plugin-control may include a link or refer to another viewer plugin-control object which may then be displayed in a separate layer. Multi-layering may be used, inter alia, for vector animation, panoramic perspectives, moving an object in a virtual reality environment, 3D object animation without integrating the 3D object with any other media type, and for displaying a watermark within the window (e.g., Web page, Adobe® Acrobat® document, PDA-based software window, or e-book screen).

Click Through Layers

One problem with DHTML layers as currently employed in Web browsers is that it usually is not possible to click through the layer to objects and text behind or underneath the layer. One embodiment of the present invention solves this problem by implementing a script that is cross-platform compatible and allows a user the ability to access text and other objects underneath the layer. Another embodiment of the present invention, implements a script that is specific to one or more window-based applications (e.g., Web browsers) but is not generally cross-platform compatible. Conventional methods of allowing a user to click through a layer have been platform-specific, such as, for example, Comet Cursor®'s implementation, which uses platform specific scripts to achieve this result. The present invention may implement a script that may be cross-platform compatible or platform-specific and in either case, passes a click or other event in the layer to the window-based application. This click or event may then be acted upon by the window-based application creating the perception of transparency between the layer and the underlying window. This click through feature may also be used to implement watermark images and text using DHTML layering.

Transitions

The overlaying of one or more objects with a window (e.g., Web page, Adobe® Acrobat® document, PDA-based software window, or e-book screen) may result in a significant alteration to the presentation viewed by a user. In order to provide a smooth and graceful transition from the presentation of the window prior to the integration of the overlay plane to the presentation of the overlay plane with the window, transitions may be used in one embodiment of the present invention to improve the overall presentation to the user. Conventional DHTML layers allow only a very limited implementation of transitions. For example, simple positional transitions such as a simple wipe (e.g., wipe up, wipe down, wipe left, and wipe right) may be implemented using conventional DHTML by moving the layer on the window of a Web browser. In another example, simple zoom-in and zoom-out transitions may be implemented using conventional DHTML by resizing the layer to achieve the zooming effect. In one embodiment of the present invention, transitions may be implemented within a layer without the need to move or resize the layer to achieve the transition. Using the simple DHTML transitions as an example, the present invention, according to one embodiment, may implement a wipe transition within the layer without requiring the layer to move on the window. Additionally, the present invention, also according to this embodiment, may perform a zoom transition without requiring the resizing of the layer or non-layer displayed overlay plane.

FIGS. 8a-8e are screen images (i.e., screen shots) of a transparent transition of an overlay plane containing an MP3 player image overlaid with a Web page using a viewer plugin-control according to one embodiment of the present invention. FIGS. 8a-8e display a Web page (i.e., a window) 800a-800e containing several hyperlinks including a hyperlink for an "MP3 Player" 801a-801e. According to the example displayed in FIGS. 8a-8e, when the user clicks on the "MP3 Player" hyperlink 801a-801e, an overlay plane containing an image of an MP3 player 802b-802e is gradually faded in. The presentation as seen by the user is illustrated in a sequential display of screen images beginning with FIG. 8a, where the user has not yet initiated the overlaying process, to the gradually fading in of the overlay plane 802b-802d shown in FIGS. 8b-8d, and finally to the overlay plane being displayed in its final form 802e in FIG. 8e. Though the embodiment illustrated in FIGS. 8a-8e relates to a Web page and uses a viewer plugin-control, the same transparent transition may be implemented in other embodiments of the present where a viewer plugin-control is not used and/or where the window is displayed for another window-based application such as an Adobe® Acrobat® document, a PDA-based software window, or an e-book screen.

FIGS. 9a-9g are screen images (i.e., screen shots) of a rotating, zoom-in transition of an overlay plane containing an image of a Palm Pilot™ (i.e., a Palm IIIe™) personal digital assistant (PDA) where the overlay plane is placed in a DHTML layer that is overlaid with a Web page using a viewer plugin-control according to one embodiment of the present invention. FIGS. 9*a*-9*g* display a Web page (i.e., a window) 900*a*-900*g* containing several hyperlinks including a hyperlink for a "Palm-powered" handheld 901*a*-901*g*. According to the example displayed in FIGS. 9*a*-9*g*, when the user clicks on the "Palm-powered" hyperlink 901*a*-901*g*, an image of a Palm IIIe™ PDA 902*b*-902*g* (part of the overlay plane and DHTML layer) is gradually zoomed in (i.e., increased from a small-size until it is full-size) while at the same time, the user perspective of the Palm IIIe™ (i.e., the camera angle or view) is rotated. During the transition, the DHTML layer used in FIGS. 9*b*-9*g* does not change in size or location, only the object (i.e., the Palm IIIe™ PDA image 902*b*-902*g*) changes within the layer. The presentation as seen by the user is illustrated in a sequential display of screen images beginning with FIG. 9*a*, where the user has not yet initiated the overlaying process, to the gradually zooming in and rotating of the object in the overlay plane 902*b*-902*e* shown in FIGS. 9*b*-9*e*, and finally to the overlay plane being displayed in its final form 902*g* in FIG. 9*g*. In the example illustrated in FIGS. 9*a*-9*g*, the overlay plane zooms in from the point where the user initiated the overlaying process (i.e., the "Palm-powered" hyperlink). In one embodiment of the present invention, the zoom transition (whether zooming out or zooming in) may occur, when the overlaying process is user initiated, from the point where the user initiated the overlaying process such as the hyperlink, banner, or graphical icon on the window. In another embodiment of the present invention, the zoom transition (whether zooming out or zooming in) may occur from any arbitrary location on the window. Though the embodiment illustrated in FIGS. 9*a*-9*g* relates to a Web page and uses a viewer plugin-control, the same zoom transition and/or rotating transition may be implemented in other embodiments of the present where a viewer plugin-control is not used and/or where the window is displayed for another window-based application such as an Adobe® Acrobat® document, a PDA-based software window, or an e-book screen.

Figure 10A:
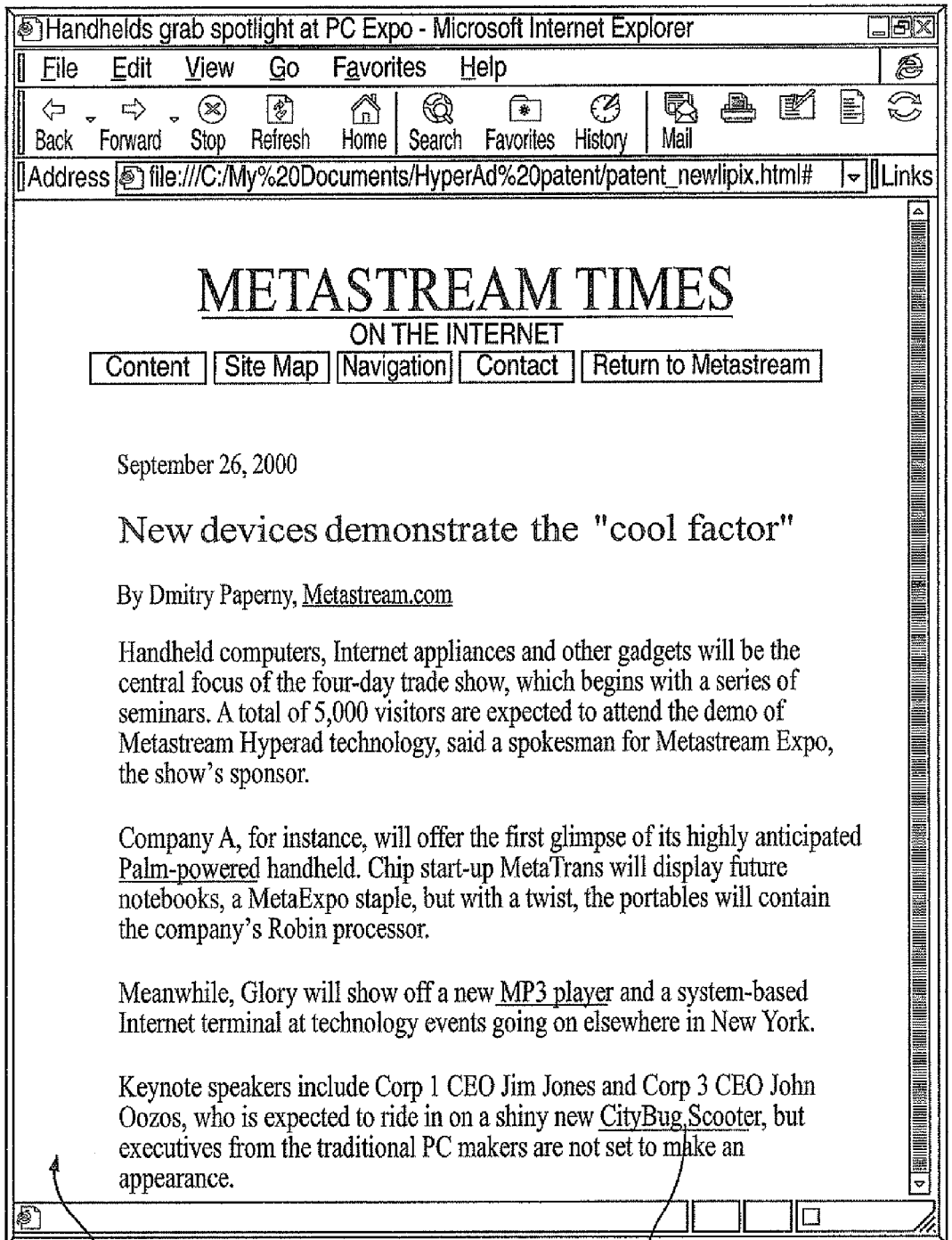
FIGS. 10a-10f are screen images (i.e., screen shots) of an animated transition of an overlay plane containing an animation of a CityBug™ Scooter where the overlay plane (i.e., the animation) is placed in a DHTML layer that is overlaid with a Web page using a viewer plugin-control according to one embodiment of the present invention.
Figure 10B:
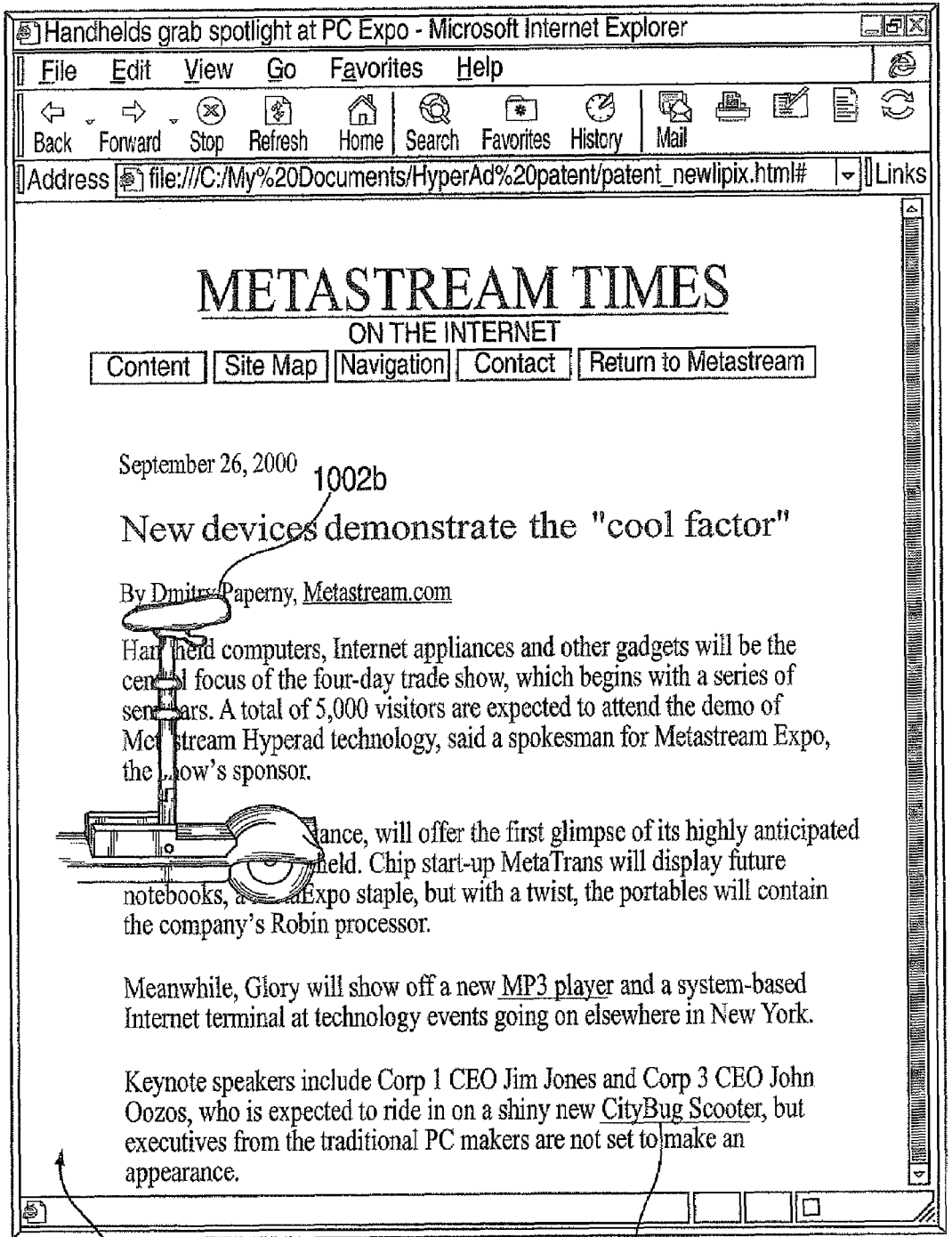
Figure 10C:
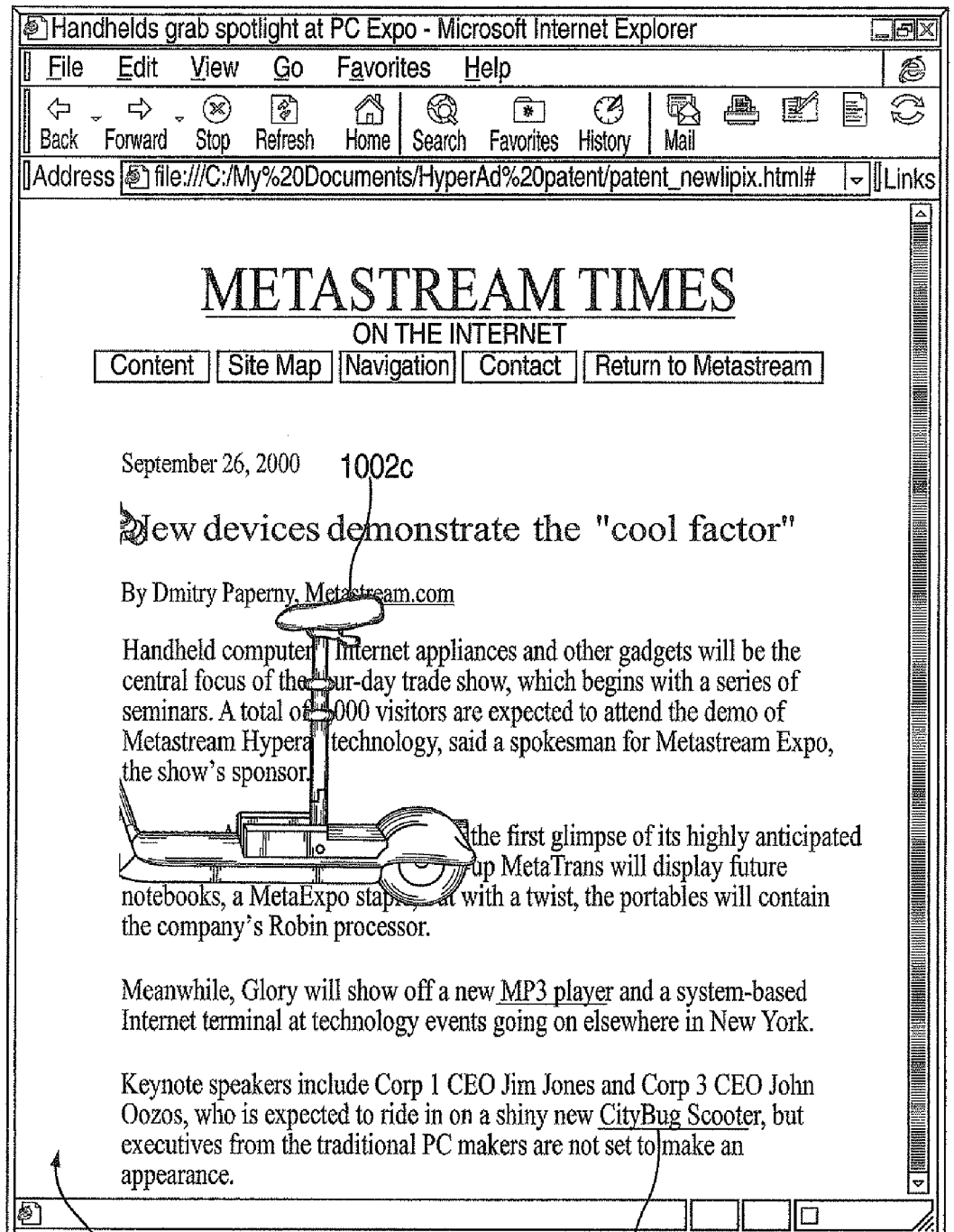
Figure 10D:
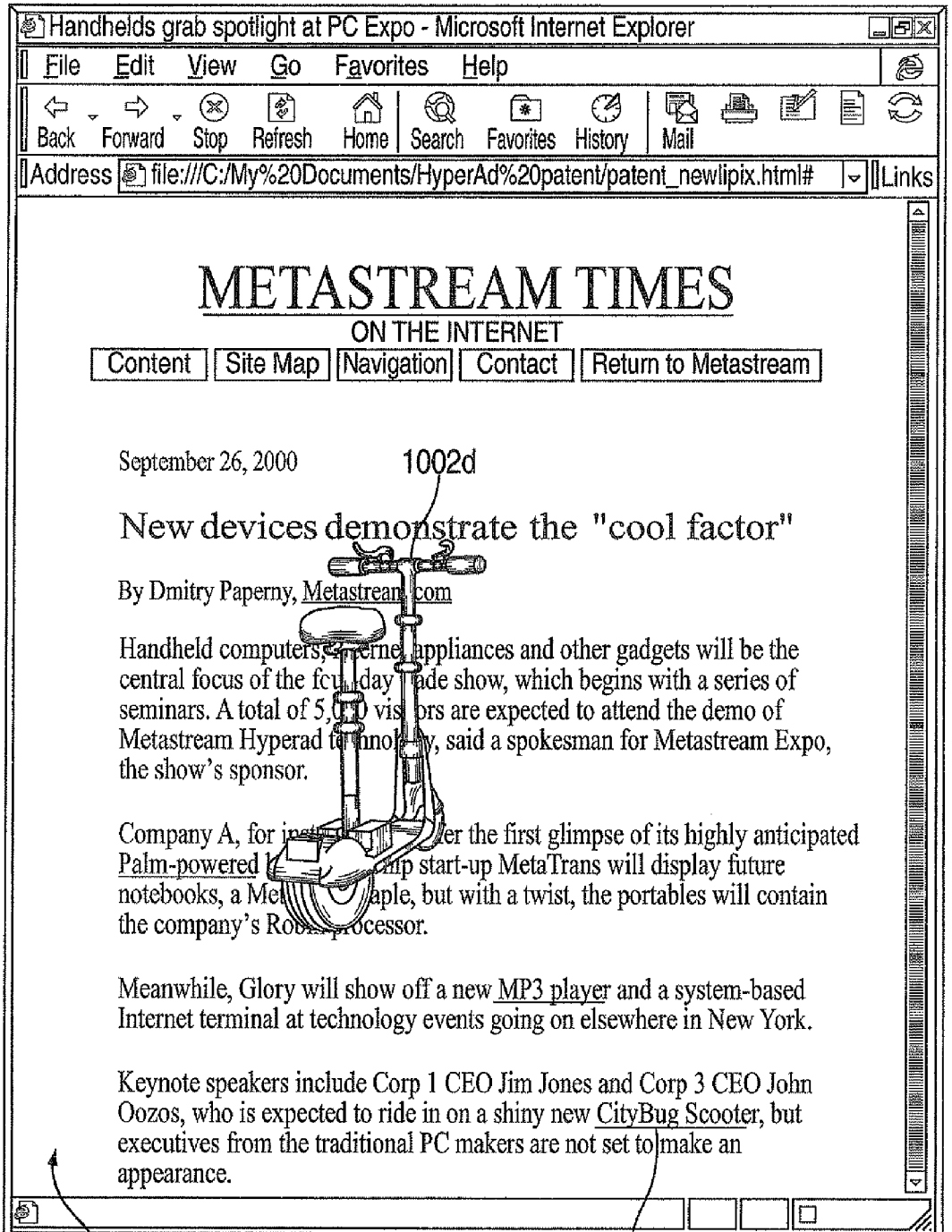
Figure 10E:
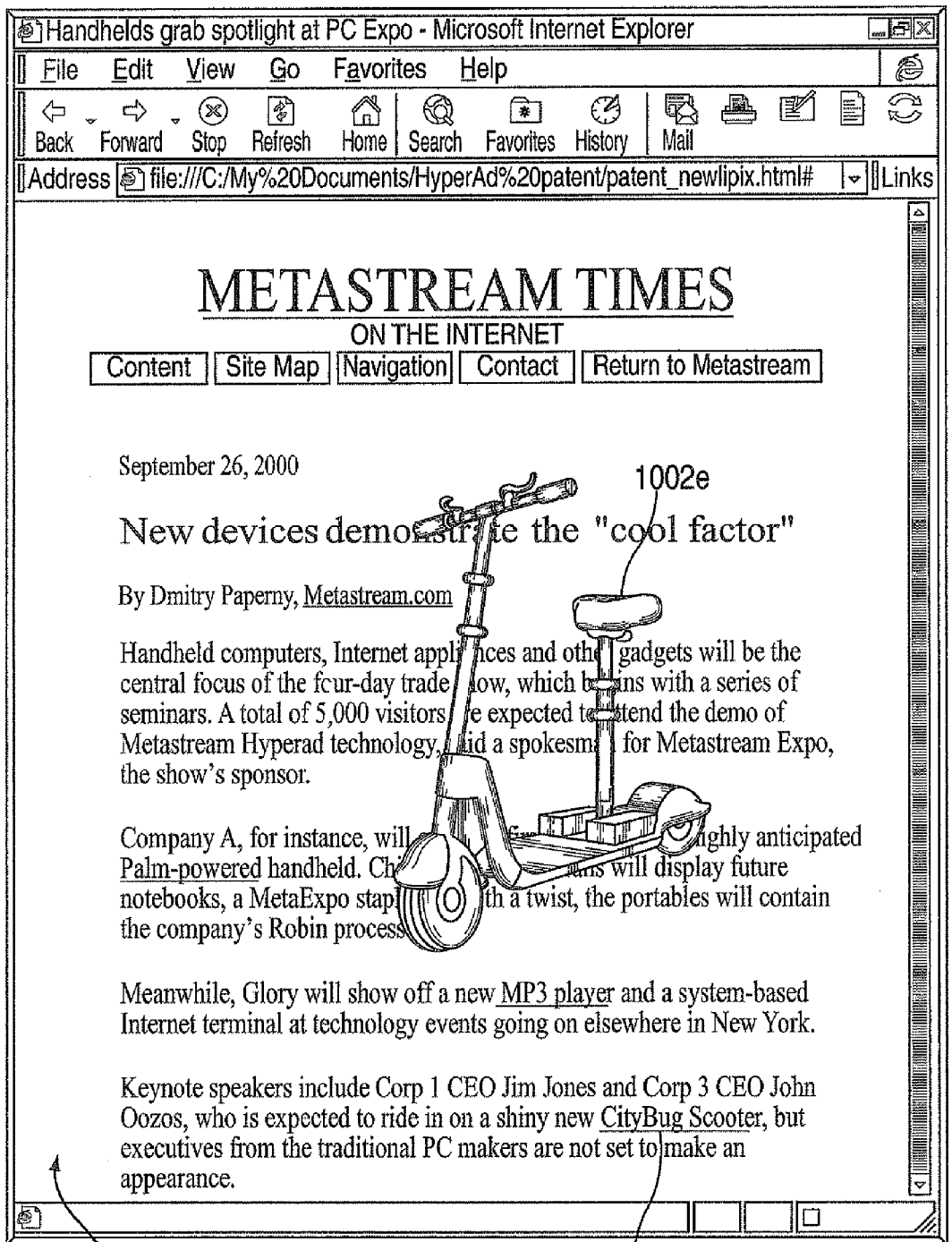

FIGS. 10*a*-10*f* are screen images (i.e., screen shots) of an animated transition of an overlay plane containing an animation of a CityBug Scooter™ where the overlay plane (i.e., the animation) is placed in a DHTML layer that is overlaid with a Web page using a viewer plugin-control according to one embodiment of the present invention. FIGS. 10*a*-10*f* display a Web page (i.e., a window) 1000*a*-1000*f* containing several hyperlinks including a hyperlink for a "CityBug Scooter" 1001*a*-1001*f*. According to the example displayed in FIGS. 10*a*-10*f*, when the user clicks on the "CityBug Scooter" hyperlink 1001*a*-1001*f*, an animation (which is part of the overlay plane and DHTML layer) of a CityBug Scooter™ 1002*b*-1002*f* is executed within the DHTML layer (i.e., a CityBug Scooter™ drives around inside the layer coming to a stop on the center of the Web page). The presentation as seen by the user is illustrated in a sequential display of screen images beginning with FIG. 10*a*, where the user has not yet initiated the overlaying process, to the displaying of the animation 1002*b*-1002*e* showing a CityBug Scooter™ driving around on the layer as displayed in FIGS. 10*b*-10*e*, and finally to the overlay plane being displayed in its final form 1002*f* in FIG. 10*f* at the end of the animation. The example illustrated in FIGS. 10*a*-10*f* can also be used to explain how one embodiment of a wipe transition may occur without requiring a layer to be moved. In this example, a transparent animation may run on a transparent DHTML layer (transparent referring to both the animation and layer having transparent pixels through which elements of the underlying Web page are visible) where the animation shows the overlay plane being wiped on or off the window. FIGS. 10*b* and 10*f* provide screen images that may provide an example of how an animation can be used to show a wipe transition. In one example, the CityBug Scooter™ may be wiped on to the layer by animating from 10*b* to 10*f* as a straight movement of the scooter onto the Web page. In another example, the CityBug Scooter™ may be wiped off the layer by animating from 10*f* to 10*b* as a straight movement of the scooter off the Web page. Though the embodiment illustrated in FIGS. 10*a*-10*f* relates to a Web page and uses a viewer plugin-control, the same animation transition may be implemented in other embodiments of the present where a viewer plugin-control is not used and/or where the window is displayed for another window-based application such as an Adobe® Acrobat® document, a PDA-based software window, or an e-book screen.

Figure 12:
FIG. 12 is a screen image (i.e., a screen shot) of a page curl transition where the entire window or section of the window (i.e., Web page) appears to curl as if a page in a book is being turned revealing the same window or section of the window with the overlay plane overlaid on it according to one embodiment of the present invention.
Figure 13A:
FIGS. 13a-13f are screen images (i.e., screen shots) of a ripple transition (or water ripple transition) of an overlay plane containing an 3D MP3 image where the overlay plane (i.e., the MP3 image) is placed in a DHTML layer that is overlaid with a Web page using a viewer plugin-control according to one embodiment of the present invention.
Figure 13B:
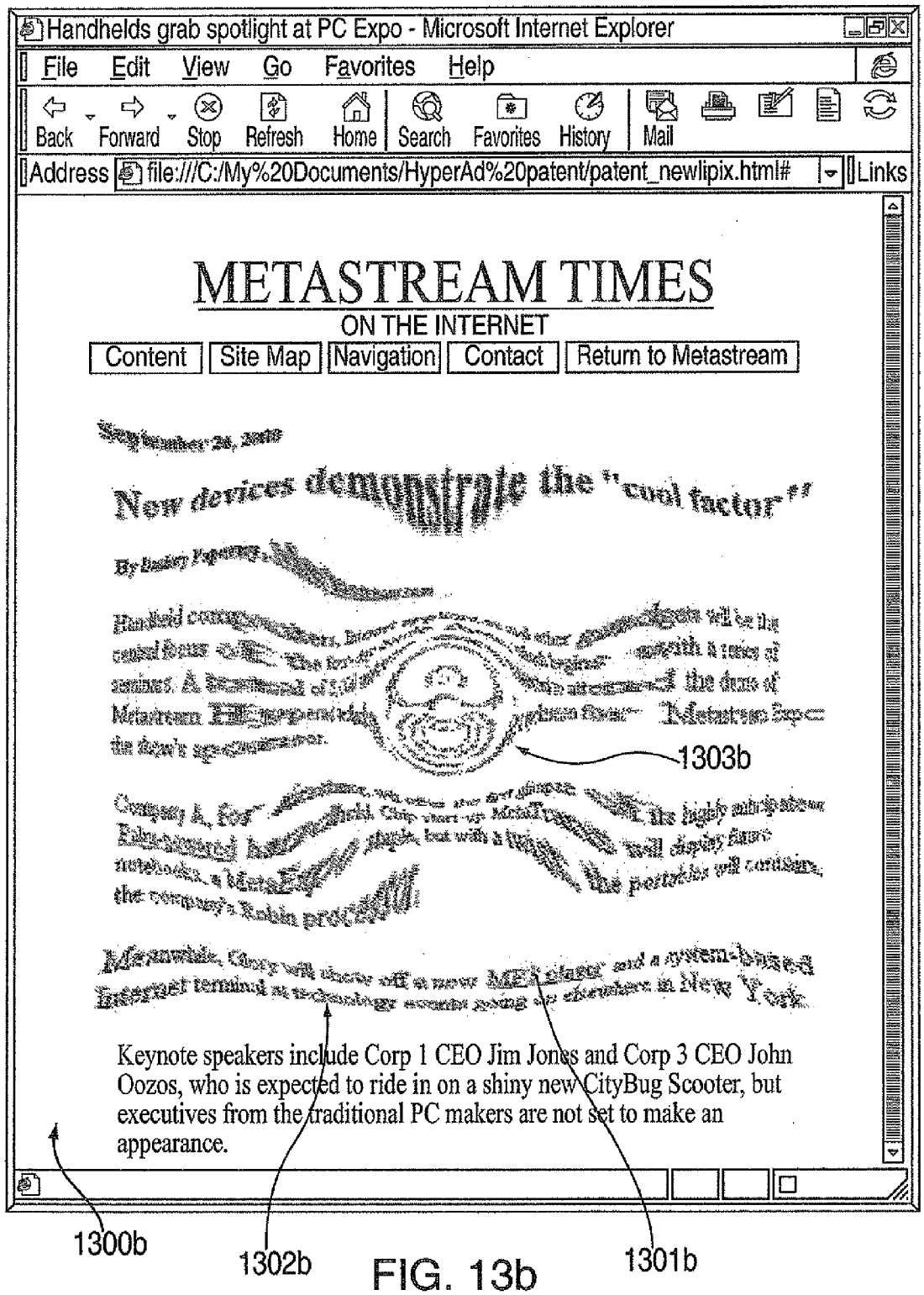
Figure 13C:
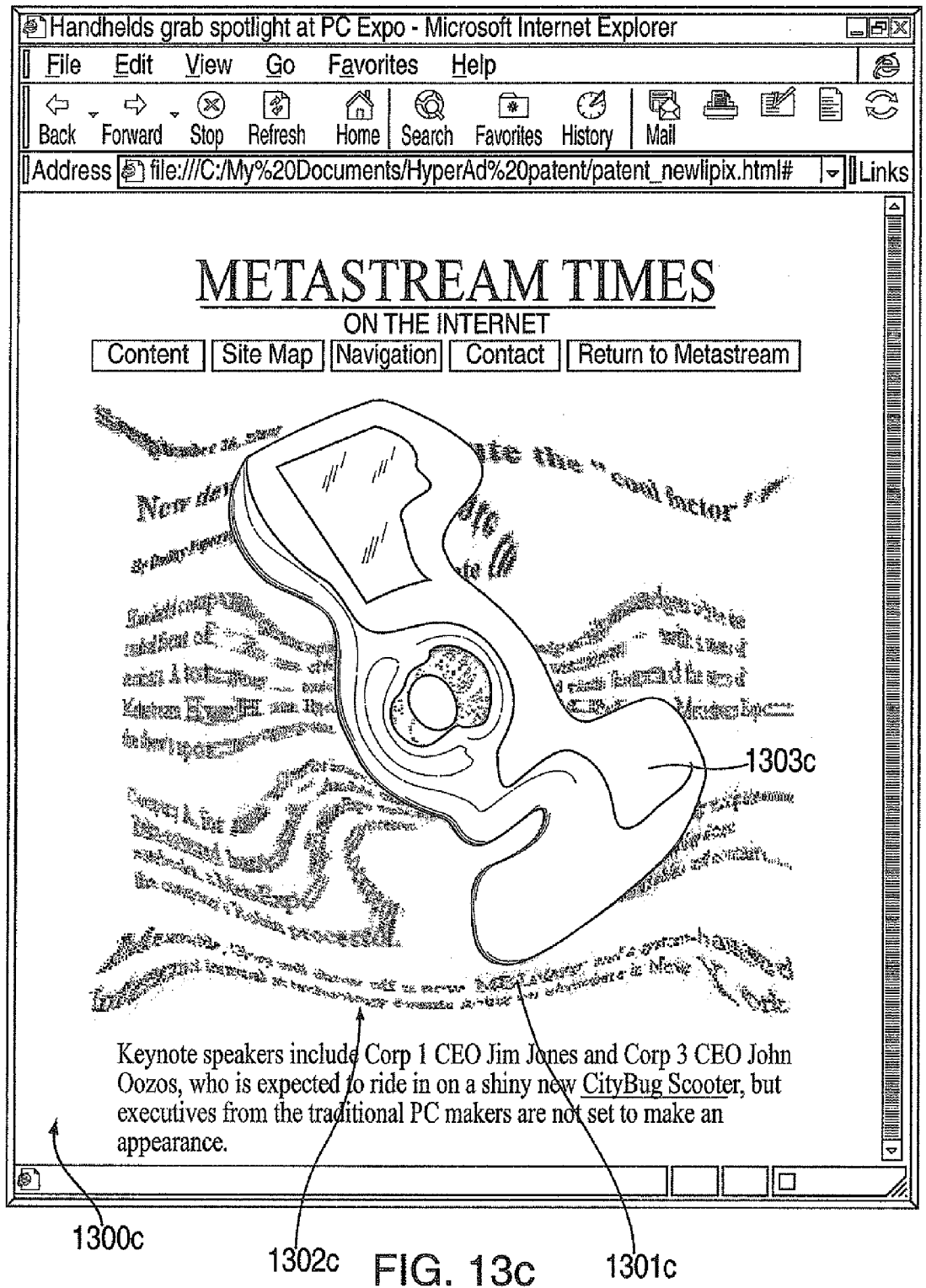
Figure 13D:
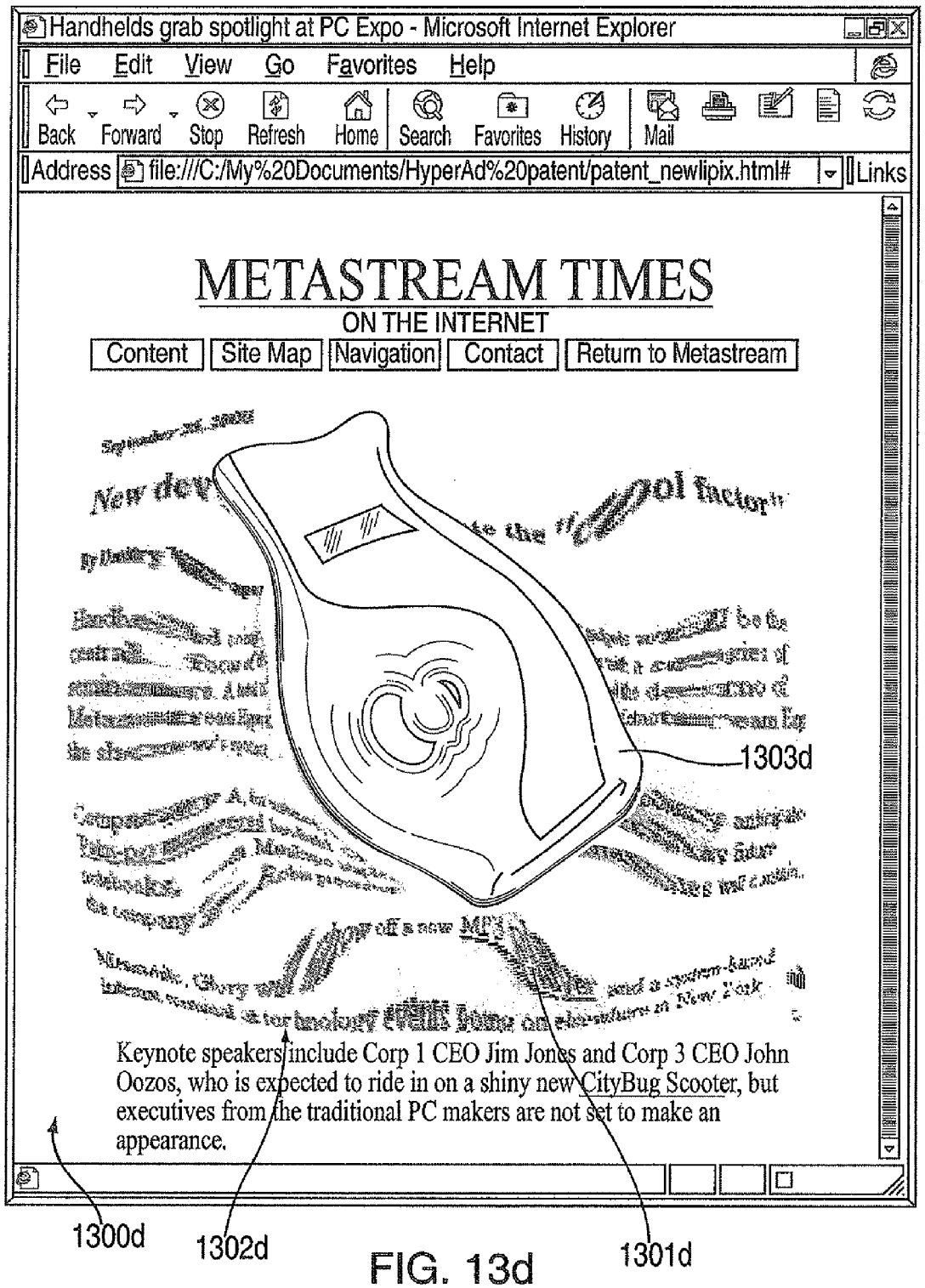
Figure 13E:
Figure 13F:

FIG. 12 is a screen image (i.e., a screen shot) of a page curl transition where the entire window or section of the window (i.e., Web page) (the "before" image of the window) appears to curl as if a page in a book is being turned revealing the same window or section of the window with the overlay plane overlaid on it (the "after" image of the window) according to one embodiment of the present invention. FIG. 12 displays a Web page 1200 containing three hyperlinks including a hyperlink for an "MP3 Player" 1201. According to the example displayed in FIG. 12, when the user clicks on the "MP3 Player" hyperlink 1201, the original image of the window 1202 appears to curl revealing a new underlying image of the window or section of the window including the overlay plane 1203. The overlay plane may but does not need to be included in a DHTML layer according to one embodiment of the present invention. A page curl as illustrated in the example in FIG. 12 is an innovative, advanced type of transition that is not possible to implement in conventional implementations of DHTML layers.

FIGS. 13*a*-13*f* are screen images (i.e., screen shots) of a ripple transition (or water ripple transition) of an overlay plane containing a 3D MP3 image where the overlay plane (i.e., the MP3 image) is placed in a DHTML layer that is overlaid with a Web page using a viewer plugin-control according to one embodiment of the present invention. FIGS. 13*a*-13*f* display a Web page (i.e., a window) 1300*a*-1300*f* containing three hyperlinks including a hyperlink for an "MP3 Player" 1301*a*-1301*f*. According to the example displayed in FIGS. 13*a*-13*f*, when the user clicks on the "MP3 Player" hyperlink 1301*a*-1301*f*, a ripple (or water ripple) effect occurs 1302*b*-1302*e* to the Web page while the 3D MP3 image 1303*b*-1303*f* (which is part of the overlay plane and DHTML layer) is gradually faded in. The presentation as seen by the user is illustrated in a sequential display of screen images beginning with FIG. 13*a*, where the user has not yet initiated the overlaying process, to the displaying of the ripple effect 1302*b*-1302*e* while the MP3 image 1303*b*-1303*e* is gradually faded in, and finally to the overlay plane being displayed in its final form 1302*f* in FIG. 13*f* at the conclusion of the transition and the ripple effect. Though the embodiment illustrated in FIGS. 13*a*-13*f* relates to a Web page and uses a viewer plugin-control, the same ripple effect transition may be implemented in other embodiments of the present where a viewer plugin-control is not used and/or where the window is displayed for another window-based application such as an Adobe® Acrobat® document, a PDA-based software window, or an e-book screen.

According to one embodiment of the present invention, as previously stated, all the transitions discussed above may also be performed where the overlay plane is displayed without the use of a window-based application provided layer feature (e.g., DHTML layers). Another embodiment of the present invention implements the above transitions without using a separate plugin-control. As illustrated in FIG. 7, in one embodiment of the present invention, the overlay plane and the transitions may use soft edges where the boundary of the overlay plane is not clearly delineated. Soft edges is a feature that is not available conventionally in DHTML layers.

User Perspective

In one embodiment of the present invention as perceived from the user's perspective, the user will view a window (e.g., Web page, Adobe® Acrobat® document, PDA-based software window, or e-book screen) containing at least one of a hyperlink, a banner, and/or a graphical icon. In other respects, the window (e.g., Web page, Adobe® Acrobat® document, PDA-based software window, or e-book screen) may appear for all manner and purposes like any other similar window. For example, if the window is a Web page containing a news or press release, the Web page will appear as any other news or press release Web page may appear. This Web page, according to one embodiment of the present invention, may include at least one hyperlink, banner, and/or graphical icon all of which may be found on Web pages not involved with the present invention. From the user's perspective, nothing will appear unusual until some event either user initiated, such as a user initiated click event, or non-user initiated, such as timing event, triggers the overlaying process. For example, a window (e.g., Web page, Adobe® Acrobat® document, PDA-based software window, or e-book screen) will not appear unusual until the user clicks on a hyperlink, banner, or graphical icon related to the present invention. The result of the triggered overlaying process may be the appearance of additional content overlaid on the window (e.g., Web page, Adobe® Acrobat® document, PDA-based software window, or e-book screen). For example, a user clicking on a Web page banner for an Internet bookseller may cause an advertisement in the form of a transparent animation to be overlaid on a portion of the Web page. In this example according to one embodiment of the present invention, the user may click on items on the Web page through the transparent portion of the advertisement animation which may result in the advertisement (i.e., the animation) being hidden from the user's view and the click event on the Web page being processed for the user. In this situation, according to one embodiment of the present invention, the advertisement animation is still present but hidden from the user so that if the user again initiates the overlaying process for this advertisement, the advertisement animation may only need to be made visible to the user instead of re-initiating the overlaying process anew. In another example, a user clicking on a hyperlink for a personal digital assistant may cause a fully rotatable and scalable 3D image of the PDA to appear overlaid with the window (e.g., Web page, Adobe® Acrobat® document, PDA-based software window, or e-book screen). According to one embodiment of the present invention, the user may execute the same initiating function, such as clicking on the same hyperlink, to cancel the additionally overlaid content. For example, after the 3D image of the PDA is overlaid with the user window, the user may again click on the same hyperlink with a result that the 3D image disappears from the window (i.e., is no longer overlaid with the window).

FIGS. 8a, 9a, 10a, and 13a are exemplary illustrations of a news release Web page containing at least three hyperlinks according to one embodiment of the present invention. When the user clicks on one of the hyperlinks, additional content is overlaid on the Web page. FIGS. 8a-8e are an exemplary illustration of a 3D MP3 player image content being overlaid with the Web page according to one embodiment of the present invention. FIGS. 9a-9g are an exemplary illustration of a 3D PDA image content being overlaid with the Web page according to one embodiment of the present invention. FIGS. 10a-10f are an exemplary illustration of a scooter animation content being overlaid with the Web page according to one embodiment of the present invention. FIG. 12 is an exemplary illustration of al 3D MP3 player image content being overlaid with the Web page according to one embodiment of the present invention. FIGS. 13a-13f are another exemplary illustration of a 3D MP3 player image content being overlaid with the Web page according to one embodiment of the present invention. The user may cancel the display of the additional content in these exemplary embodiments of the present invention by either clicking on the additional overlaid content (except for the scooter animation content shown in FIGS. 10a-10f where clicking on the overlay plane image of the scooter causes a further animation sequence to commence as shown in FIGS. 11a-11b) or by clicking on the hyperlink on which the user initially clicked to trigger the overlaying process.

Reverse Perspective

The previous embodiments of the present invention provided examples of additional content added to the window (e.g., Web page, Adobe® Acrobat® document, PDA-based software window, or e-book screen) of a window-based application (e.g., Web browser, Adobe® Acrobat®, PDA-based software, or e-book). The reverse is also possible. In one embodiment of the present invention, the initiation of the overlaying process may result in the removal of content from a window. For example, the window may initially be displayed with information contained in an overlay plane which, in one embodiment of the present invention, may be contained in a DHTML layer. When a user or non-user initiated event occurs triggering the overlaying process, the information contained in the overlay plane is either removed from the window display or hidden from the user (i.e., made non-visible). This is an alternative method of implementing the present invention.

Enhanced Content & Advertising Display

As previously mentioned, one problem with displaying content on a PDA, e-book, telephone display, and other similar displays as well as with conventional advertising on either the Web or general computer-based advertising is the limited amount of space available for the display of information (e.g., schematics, technical illustrations, banners, etc.) in a window, display screen, or Web page. This may necessitate the use of a hyperlink or other mechanism to move the user from the currently displayed window or screen (or portion thereof) to another separate window or section of a window (e.g., an advertisement page in an Adobe® Acrobat® document) to display additional information such as the full advertising content to be conveyed to the user. Additionally, Web site operators and owners as well as software providers are reluctant to provide key "real estate" (locations) on a Web page, in a window, or on a display screen to advertisers because it often detracts from their own content and reduces the appeal of their Web page or software to users. The present invention may solve both of these problems by providing an innovative method for providing expanded and reusable display space ("real estate") within a window (e.g., Web page, Adobe® Acrobat® document, PDA-based software window, or e-book screen). The ability to display an overlay plane on top of any area within a window (e.g., Web page, Adobe® Acrobat® document, PDA-based software window, or e-book screen) allows the present invention to display expanded content and/or a full-size advertisement that may incorporate sufficient additional information without requiring a hyperlink to another separate window. The use of an overlay plane in the manner described above also allows the present invention to reuse window space (the "real estate" of the window) for multiple advertisements and displays of content thereby enhancing a user's experience by avoiding the sending of the user (e.g., via hyperlinks) to other windows (e.g., Web pages, Adobe® Acrobat® documents, PDA-based software windows, or e-book screens) in order to obtain additional information whether that additional information is additional content or advertisements. The reuse of window space may also allow Web page operators and owners and software providers to sell more advertising on a window thereby possibly improving their revenues, for example, in the operation of their Web site and Web pages. Additionally, the reuse of window space allows content providers (including advertisers) to present their content in an innovative and attention-grabbing manner that may also greatly increase the content space available for use.

The reuse of window space may occur regardless of the type of overlaying performed between the overlay plane and the window according to one embodiment of the present invention. In other words, the display space used by an overlay plane may be reused regardless of the method by which the overlay plane is overlaid with the window. For example, the method of overlaying the overlay plane with a window may include using a blending technique (blend compositing), a replacement technique (pixel replacement-overwriting), or a transparent drawing technique (compositing with transparent pixels in the overlay plane).

What is claimed is:

1. A method for overlaying an object in a window of a software application, comprising the steps of:
   receiving a request for the object to be displayed in the window, the request being initiated by a behavior of a user viewing the window;
   creating an overlay plane including the object as a function of the receiving step in a layer, the layer containing the object is defined based on a definition of the window; and
   displaying the object, in response to the request, by overlaying the created overlay plane in the window, wherein the object is displayed in a predetermined location relative to the window that is independent of a location of a pointing device that is positioned based on a behavior of a user viewing the window.

2. The method according to claim 1, wherein the window is a markup language document.

3. The method according to claim 2, wherein the markup language document is an HTML document.

4. The method according to claim 2, wherein the markup language document is an XML document.

5. The method according to claim 1, wherein the software application is a Web browser.

6. The method according to claim 5, wherein the Web browser is at least one of Netscape Navigator, Netscape Communicator, and Microsoft Internet Explorer.

7. The method according to claim 1, wherein the receiving step includes receiving the request as a result of the user clicking on a hyperlink.

8. The method according to claim 1, wherein the receiving step includes receiving the request as a result of the user clicking on a banner.

9. The method according to claim 1, wherein the receiving step includes receiving the request as a result of the user clicking on a graphical icon.

10. The method according to claim 1, wherein the receiving step includes receiving the request as a result of the user initiating a click event.

11. The method according to claim 1, wherein the receiving step includes receiving the request as a result of the user initiating a rollover event.

12. The method according to claim 1, wherein the receiving step includes receiving the request as a result of the user initiating a timing event.

13. The method according to claim 1, wherein the receiving step includes receiving the request as a result of the user requesting a new window to be displayed.

14. The method according to claim 13, wherein the new window is defined by a markup language document.

15. The method according to claim 14, wherein the markup language document is an HTML document.

16. The method according to claim 14, wherein the markup language document is an XML document.

17. The method according to claim 1, wherein the creating step further comprises:
   creating an overlay image including the object as a function of the receiving step.

18. The method according to claim 17, wherein the displaying step further comprises:
   displaying the object, in response to the request, by overlaying the created overlay image in the window, wherein the object is displayed in a predetermined location relative to the window that is independent of a location of a pointing device.

19. The method according to claim 1, wherein the overlay plane utilizes semi-transparent edges.

20. The method according to claim 1, wherein the displaying step includes the step of:
   using a transition effect to display the created overlay plane, wherein the transition effect is at least one of a transparent transition, a rotating object transition, a zoom transition, an animation transition, a wipe transition, a page curl transition, and a ripple transition.

21. The method according to claim 1, wherein the displaying step further comprises:
   displaying the object, in response to the request, by overlaying the created overlay plane in the window, wherein the overlay plane is directly composited with the window without using functionality of the software application and wherein the object is displayed in a predetermined location relative to the window that is independent of a location of a pointing device.

22. A method for overlaying an object in a window of a software application, comprising the steps of:
   receiving a request for the object to be displayed in the window, the request being initiated by a behavior of a user viewing the window;
   creating an overlay plane using at least one layer including the object as a function of the receiving step, wherein the layer is created using a layering functionality of the software application and is defined based on a definition of the window; and
   displaying the object, in response to the request, by overlaying the layer in the window, wherein the object is displayed in a predetermined location relative to the window that is independent of a location of a pointing device.

23. The method according to claim 22, wherein the layer is a DHTML layer.

24. A method for overlaying an object in a window of a software application, comprising the steps of:
   receiving a request for the object to be displayed in the window, the request being included in at least one of the definition of the window and a content for the window;

creating an overlay plane using at least one layer including a reference to the object as a function of the receiving step, wherein the layer is created using a layering functionality of the software application and the layer, defined based on the window definition, is hidden from a user; and displaying the object, in response to the request, by overlaying the layer in the window, wherein the object is displayed in a predetermined location relative to the window that is independent of a location of a pointing device.

25. The method according to claim 24, wherein the displaying step further comprises:
displaying the layer to the user in response to the request by overlaying the layer in the window, wherein the reference to the object initiates the streaming of an object data to the layer and the object is displayed in a predetermined location relative to the window that is independent of a location of a pointing device.

26. The method according to claim 24, wherein the layer is a DHTML layer.

27. A method for overlaying an object in a window of a software application, comprising the steps of:
receiving a request for the object to be displayed in the window, the request being included in at least one of the definition of the window and a content for the window;
creating an overlay plane using at least one layer including the object as a function of the receiving step, wherein the layer is created using a layering functionality of the software application and the layer, defined based on the window definition, is hidden from a user;
after creating the overlay plane, overlaying the hidden layer over content being displayed in the window and hiding the hidden layer from a user for a specified time period; and
at the end of the specified time period, displaying the object hidden in the layer over the content in the window, wherein the object is viewable by the user and displayed in a predetermined location relative to the window that is independent of a location of a pointing device.

28. The method according to claim 27, wherein the layer is a DHTML layer.

29. A method for overlaying an object in a window of a software application, comprising the steps of:
receiving, by a plugin-control, a request for the object to be displayed in the window, the request being initiated by a behavior of a user viewing the window;
creating, by the plugin-control, an overlay plane including the object as a function of the receiving step, the object is contained in a layer defined by a definition of the window; and
displaying the object in response to the request by overlaying, by the plugin-control, the created overlay plane in the window, wherein the object is displayed in a predetermined location relative to the window that is independent of a location of a pointing device.

30. The method according to claim 29, wherein the window is a markup language document.

31. The method according to claim 30, wherein the markup language document is an HTML document.

32. The method according to claim 30, wherein the markup language document is an XML document.

33. The method according to claim 29, wherein the software application is a Web browser.

34. The method according to claim 33, wherein the Web browser is at least one of Netscape Navigator, Netscape Communicator, and Microsoft Internet Explorer.

35. The method according to claim 29, wherein the receiving step includes receiving, by the plugin-control, the request as a result of the user clicking on a hyperlink.

36. The method according to claim 29, wherein the receiving step includes receiving, by the plugin-control, the request as a result of the user clicking on a banner.

37. The method according to claim 29, wherein the receiving step includes receiving, by the plugin-control, the request as a result of the user clicking on a graphical icon.

38. The method according to claim 29, wherein the receiving step includes receiving, by the plugin-control, the request as a result of the user initiating a click event.

39. The method according to claim 29, wherein the receiving step includes receiving, by the plugin-control, the request as a result of the user initiating a rollover event.

40. The method according to claim 29, wherein the receiving step includes receiving, by the plugin-control, the request as a result of the user initiating a timing event.

41. The method according to claim 29, wherein the receiving step includes receiving, by the plugin-control, the request as a result of the user requesting a new window to be displayed.

42. The method according to claim 41, wherein the new window is defined by a markup language document.

43. The method according to claim 42, wherein the markup language document is an HTML document.

44. The method according to claim 42, wherein the markup language document is an XML document.

45. The method according to claim 29, wherein the creating step further comprises:
creating, by the plugin-control, a layer wherein the layer is hidden from the user and the layer includes a reference to the object.

46. The method according to claim 45, wherein the displaying step further comprises:
displaying the layer to the user in response to the request by overlaying, by the plugin-control, the layer in the window, wherein the reference to the object initiates the streaming of an object data to the layer and wherein the object is displayed in a predetermined location relative to the window that is independent of a location of a pointing device.

47. The method according to claim 46, wherein the layer is a DHTML layer.

48. The method according to claim 29, wherein the creating step further comprises:
creating, by the plugin-control, a layer wherein the layer is hidden from the user and the layer includes the object.

49. The method according to claim 48, wherein the displaying step further comprises:
displaying the layer to the user in response to the request by overlaying, by the plugin-control, the layer in the window, wherein the object is displayed in a predetermined location relative to the window that is independent of a location of a pointing device.

50. The method according to claim 49, wherein the layer is a DHTML layer.

51. The method according to claim 29, wherein the creating step further comprises:
creating, by the plugin-control, a overlay image including the object as a function of the receiving step.

52. The method according to claim 51, wherein the displaying step further comprises:
displaying the object in response to the request by overlaying, by the plugin-control, the created overlay image in the window using the software application provided mechanism for the display of layers with the window, wherein the object is displayed in a predetermined location relative to the window that is independent of a location of a pointing device.

53. The method according to claim 51, wherein the displaying step further comprises:

displaying the object in response to the request by overlaying, by the plugin-control, the created overlay image in the window using a plugin-control provided mechanism for the display of content with the window bypassing the software application provided mechanism for the display of layers, wherein the object is displayed in a predetermined location relative to the window that is independent of a location of a pointing device.

54. The method according to claim 29, wherein the overlay plane utilizes semi-transparent edges.

55. The method according to claim 29, wherein the displaying step includes the step of:

using a transition effect to display the created overlay plane, wherein the transition effect is at least one of a transparent transition, a rotating object transition, a zoom transition, an animation transition, a wipe transition, a page curl transition, and a ripple transition.

56. A method for overlaying an object in a window of a software application, comprising the steps of:

receiving, by a plugin-control, a request for the object to be displayed in the window, the request being initiated by a behavior of a user viewing the window;

creating, by the plugin-control, an overlay plane using at least one layer including the object as a function of the receiving step, wherein the layer is created using a layering functionality of the software application and is defined by a definition of the window; and displaying the object in response to the request by overlaying, by the plugin-control, the layer in the window, wherein the object is displayed in a predetermined location relative to the window that is independent of a location of a pointing device.

57. The method according to claim 56, wherein the displaying step further comprises:

displaying the object in response to the request by overlaying, by the plugin-control, the layer in the window, wherein the layer is overlaid with the window using a software application provided mechanism for a display of layers and wherein the object is displayed in a predetermined location relative to the window that is independent of a location of a pointing device.

58. The method according to claim 57, wherein the layer is a DHTML layer.

59. The method according to claim 56, wherein the displaying step further comprises:

displaying the object in response to the request by overlaying, by the plugin-control, the layer in the window, wherein the layer is overlaid in the window using a plugin-control provided mechanism for a display of content in the window bypassing a software application provided mechanism for a display of layers and wherein the object is displayed in a predetermined location relative to the window that is independent of a location of a pointing device.

60. The method according to claim 59, wherein the layer is a DHTML layer.

61. A method for overlaying an object in a window of a software application, comprising the steps of:

receiving, by a plugin-control, a request for the object, the request being initiated by a behavior of a user viewing the window;

creating, by the plugin-control, an overlay plane including the object as a function of the receiving step; defining a layer using the software application provided functionality, wherein a layer definition is included in a definition of the window and the layer is based on the window definition; placing the created overlay plane in the defined layer; and overlaying, by the plugin-control, the created overlay plane in the window.

62. The method according to claim 61, wherein the overlaying step further comprises:

overlaying the defined layer with the window, wherein the defined layer is overlaid with the window using the software application provided mechanism for the display of layers.

63. The method according to claim 62, wherein the layer is a DHTML layer.

64. The method according to claim 61, wherein the overlaying step further comprises:

overlaying the defined layer with the window, wherein the defined layer is overlaid with the window using a plugin-control provided mechanism for the display of the object in the layer with a window bypassing the software application provided mechanism for the display of layers.

65. A method for overlaying an object in a window of a software application, comprising the steps of:

receiving, by a plugin-control, a request for the object, the request being initiated by a behavior of a user viewing the window;

creating, by the plugin-control, an overlay plane including the object as a function of the receiving step;

defining a layer using the software application provided functionality, wherein the layer definition is included in the definition of the window, the layer is hidden from the user, the layer is defined on the window definition, and the layer includes a reference to the object;

placing the created overlay plane in the defined layer; and overlaying, by the plugin-control, the created overlay plane in the window.

66. The method according to claim 65, wherein the overlaying step further comprises:

displaying the defined layer to the user, wherein the reference to the object initiates the streaming of the object data to the defined layer which is overlaid with the window using the software application provided mechanism for the display of layers.

67. The method according to claim 66, wherein the layer is a DHTML layer.

68. The method according to claim 65, wherein the overlaying step further comprises:

displaying the defined layer to the user, wherein the reference to the object initiates the streaming of the object data to the defined layer which is overlaid with the window using a plugin-control provided mechanism for the display of content with a window bypassing the software application provided mechanism for the display of layers.

69. A method for overlaying an object in a window of a software application, comprising the steps of:

receiving, by a plugin-control, a request for the object, the request being initiated by a behavior of a user viewing the window;

creating, by the plugin-control, an overlay plane including the object as a function of the receiving step;

defining a layer using the software application provided functionality, wherein a layer definition is included in a definition of the window, the layer is hidden from the user, the layer is defined on the window definition, and the layer includes the object;

placing the created overlay plane in the defined layer; and overlaying, by the plugin-control, the created overlay plane in the window.

70. The method according to claim 69, wherein the overlaying step further comprises:

displaying the defined layer to the user, wherein the defined layer is overlaid with the window using the software application provided mechanism for the display of layers.

71. The method according to claim 70, wherein the layer is a DHTML layer.

72. The method according to claim 69, wherein the overlaying step further comprises:

displaying the defined layer to the user, wherein the defined layer is overlaid with the window using a plugin-control provided mechanism for the display of content with a window bypassing the software application provided mechanism for the display of layers.

73. A system for overlaying an object in a window of a software application, comprising:

a program memory;

a storage device; and a processor, wherein the processor is adapted to:

(i) receive a request for the object to be displayed in the window, the request being initiated by a behavior of a user viewing the window;

(ii) create an overlay plane including the object as a function of the receiving step, the object contained in a layer that is defined based on a definition of the window; and (iii) display the object, in response to the request, by overlaying the created overlay plane in the window, wherein the object is displayed in a predetermined location relative to the window that is independent of a location of a pointing device.

74. The system according to claim 73, further including:

a browser program and a browser plugin-control, executing in the processor, the browser plugin-control causing the processor to:

(i) receive a request for the object to be displayed in the window, the request being initiated by a behavior of a user viewing the window;

(ii) create an overlay plane including the object as a function of the receiving step; and (iii) display the object, in response to the request, by overlaying the created overlay plane in the window, wherein the object is displayed in a predetermined location relative to the window that is independent of a location of a pointing device.

75. The system according to claim 74, wherein the browser program is at least one of Netscape Navigator, Netscape Communicator, and Microsoft Internet Explorer.

76. The system according to claim 74, wherein the browser plugin-control is defined using the Netscape Application Programming Interface (API).

77. The system according to claim 74, wherein the browser plugin-control is at least one of a Netscape Navigator plugin and a Netscape Communicator plugin.

78. The system according to claim 74, wherein the browser plugin-control is an ActiveX control.

79. A computer-readable medium storing a set of instructions, the set of instructions capable of being executed by a processor to implement a method for overlaying an object in a window of a software application, the method comprising the steps of:

receiving a request for the object to be displayed in the window, the request being initiated by a behavior of a user viewing the window;

creating an overlay plane including the object as a function of the receiving step, the object contained in a layer that is defined based on a definition of the window; and displaying the object, in response to the request, by overlaying the created overlay plane in the window, wherein the object is displayed in a predetermined location relative to the window that is independent of a location of a pointing device.

80. A computer-readable medium storing a set of instructions, the set of instructions capable of being executed by a processor to implement a method for overlaying an object in a window of a software application, the method comprising the steps of:

receiving, by a plugin-control, a request for the object to be displayed in the window, the request being initiated by a behavior of a user viewing the window;

creating, by the plugin-control, an overlay plane including the object as a function of the receiving step, the object contained in a layer that is defined based on a definition of the window; and displaying the object in response to the request by overlaying, by the plugin-control, the created overlay plane in the window, wherein the object is displayed in a predetermined location relative to the window that is independent of a location of a pointing device.

81. A method for initiating the overlaying of an object in a window of a software application, comprising the steps of:

clicking by a user an element of the window;

creating a layer as a function of the clicking step, wherein the layer includes the object and is defined based on a definition of the window; and displaying the object by overlaying the created layer in the window, wherein the object is displayed in a predetermined location relative to the window that is independent of a location of a pointing device and wherein the layer is directly composited in the window without using a layering feature of the software application.

82. The method according to claim 81, wherein the window is a Web page.

83. The method according to claim 81, wherein the software application is a Web browser.

84. The method according to claim 83, wherein the Web browser is at least one of Netscape Navigator, Netscape Communicator, and Microsoft Internet Explorer.

85. The method according to claim 81, wherein the clicking step includes clicking by a user a hyperlink in the window.

86. The method according to claim 81, wherein the clicking step includes clicking by a user a banner in the window.

87. The method according to claim 81, wherein the clicking step includes clicking by a user a graphical icon in the window.

88. The method according to claim 81, wherein the clicking step includes clicking by a user a hot spot on the window.

89. A method for overlaying an object in a window of a software application, comprising the steps of:

receiving a request for the object to be displayed in the window, the request being initiated by a behavior of a user viewing the window;

creating an overlay plane including the object as a function of the receiving step, the object contained in a layer that is defined based on a definition of the window; and displaying the object, in response to the request, by overlaying the created overlay plane in the window, wherein the object is displayed in a predetermined location relative to the window that is independent of a location of a pointing device and wherein the overlay plane is directly composited in the window without using a layering feature of the software application.

90. A medium storing a set of instructions, the set of instructions capable of being executed by a processor to implement a method for overlaying an object in a window of a software application, the method comprising the steps of:

receiving a request for the object to be displayed in the window, the request being initiated by a behavior of a user viewing the window;

creating an overlay plane including the object as a function of the receiving step; and displaying the object, in response to the request, by overlaying the created overlay plane in the window, wherein the object is displayed in a predetermined location relative to the window that is independent of a location of a pointing device and wherein the overlay plane is directly composited in the window without using a layering feature of the software application.

91. A method for overlaying an object in a window of a software application, comprising the steps of:

receiving, by a plugin-control, a request for the object to be displayed in the window, the request being initiated by a behavior of a user viewing the window;

creating, by the plugin-control, an overlay plane including the object as a function of the receiving step; and displaying the object in response to the request by overlaying, by the plugin-control, the created overlay plane in the window, wherein the object is displayed in a predetermined location relative to the window that is independent of a location of a pointing device and wherein the overlay plane is directly composited in the window without using a layering feature of the software application.

92. A medium storing a set of instructions, the set of instructions capable of being executed by a processor to implement a method for overlaying an object in a window of a software application, the method comprising the steps of:

receiving, by a plugin-control, a request for the object to be displayed in the window, the request being initiated by a behavior of a user viewing the window;

creating, by the plugin-control, an overlay plane including the object as a function of the receiving step; and displaying the object in response to the request by overlaying, by the plugin-control, the created overlay plane in the window, wherein the object is displayed in a predetermined location relative to the window that is independent of a location of a pointing device and wherein the overlay plane is directly composited in the window without using a layering feature of the software application.

93. A system for overlaying an object in a window of a software application, comprising:

a program memory;

a storage device; and a processor, wherein the processor is adapted to:
(i) receive a request for the object to be displayed in the window, the request being initiated by a behavior of a user viewing the window;
(ii) create an overlay plane including the object as a function of the receiving step; and
(iii) display the object, in response to the request, by overlaying the created overlay plane in the window, wherein the object is displayed in a predetermined location relative to the window that is independent of a location of a pointing device and wherein the overlay plane is directly composited in the window without using a layering feature of the software application.

94. The system according to claim 93, further including:

a browser program and a browser plugin-control, executing in the processor, the browser plugin-control causing the processor to:
(i) receive a request for the object to be displayed in the window, the request being initiated by a behavior of a user viewing the window;
(ii) create an overlay plane including the object as a function of the receiving step; and
(iii) display the object, in response to the request, by overlaying the created overlay plane in the window, wherein the object is displayed in a predetermined location relative to the window that is independent of a location of a pointing device and wherein the overlay plane is directly composited in the window without using a layering feature of the software application.

* * * * *